United States Patent
Kalusivalingam et al.

(10) Patent No.: US 8,560,660 B2
(45) Date of Patent: Oct. 15, 2013

(54) METHODS AND APPARATUS FOR MANAGING NEXT HOP IDENTIFIERS IN A DISTRIBUTED SWITCH FABRIC SYSTEM

(75) Inventors: Vijayabhaskar Annamalai Kalusivalingam, San Jose, CA (US); Quaizar Vohra, Santa Clara, CA (US); Ravi Shekhar, Sunnyvale, CA (US); Jaihari Loganathan, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 224 days.

(21) Appl. No.: 12/969,233

(22) Filed: Dec. 15, 2010

(65) Prior Publication Data
US 2012/0158930 A1 Jun. 21, 2012

(51) Int. Cl.
*G06F 15/173* (2006.01)

(52) U.S. Cl.
USPC ........... 709/223; 709/224; 709/250; 370/389; 370/392

(58) Field of Classification Search
USPC ........... 709/223–224, 230, 250; 370/389–392
See application file for complete search history.

(56) References Cited

U.S. PATENT DOCUMENTS

| 5,138,615 | A | 8/1992 | Lamport et al. |
|---|---|---|---|
| 5,801,641 | A | 9/1998 | Yang et al. |
| 5,825,772 | A | 10/1998 | Dobbins et al. |
| 5,913,921 | A | 6/1999 | Tosey et al. |
| 5,926,473 | A | 7/1999 | Gridley |
| 5,987,028 | A | 11/1999 | Yang et al. |
| 6,075,773 | A | 6/2000 | Clark et al. |
| 6,212,183 | B1 | 4/2001 | Wilford |
| 6,246,692 | B1 | 6/2001 | Dai et al. |
| 6,385,198 | B1 | 5/2002 | Ofek et al. |

(Continued)

FOREIGN PATENT DOCUMENTS

| EP | 1 318 628 A1 | 6/2003 |
|---|---|---|
| EP | 1 758 320 A1 | 2/2007 |

(Continued)

OTHER PUBLICATIONS

F.K. Liotopoulos et al., "A Modular, 160 Gbps ATM Switch Architecture for Multimedia Networking Support, based on a 3-Stage Clos Network" Proceedings of the International Teletraffic Congress. ITC-16. Teletraffic Engineering in a Competitive World. Edinburgh, UK, Jun. 7, 1999, Amsterdam: Elsevier, NL, vol. 3A, XP000877657 ISBN: 978-0-444-50268-1, pp. 529-538.

(Continued)

*Primary Examiner* — Bharat N Barot
(74) *Attorney, Agent, or Firm* — Cooley LLP

(57) ABSTRACT

In some embodiments, an apparatus implemented in a memory and/or a processing device includes a first network control entity to manage a first data plane module associated with a port from a set of ports at a first access switch. The first network control entity associates an identifier of a peripheral processing device operatively coupled to the port from the set of ports with a next hop reference. The first network control entity provides the next hop reference to a second network control entity that manages a second data plane module at a second access switch such that the second data plane module can append the next hop reference to a data packet when the peripheral processing device is within a data path between and including the second access switch and a destination peripheral processing device.

18 Claims, 8 Drawing Sheets

(56) References Cited

U.S. PATENT DOCUMENTS

| | | | |
|---|---|---|---|
| 6,393,026 B1 | 5/2002 | Irwin | |
| 6,553,028 B1 | 4/2003 | Tang et al. | |
| 6,609,153 B1 | 8/2003 | Salkewicz | |
| 6,639,910 B1 | 10/2003 | Provencher et al. | |
| 6,654,373 B1 | 11/2003 | Maher, III et al. | |
| 6,658,481 B1 | 12/2003 | Basso et al. | |
| 6,816,486 B1 | 11/2004 | Rogers | |
| 6,823,454 B1 | 11/2004 | Hind et al. | |
| 6,856,620 B1 | 2/2005 | Dunsmore et al. | |
| 6,865,673 B1 | 3/2005 | Nessett et al. | |
| 6,868,082 B1 | 3/2005 | Allen, Jr. et al. | |
| 6,934,260 B1 | 8/2005 | Kanuri | |
| 6,978,459 B1 * | 12/2005 | Dennis et al. | 718/100 |
| 7,024,592 B1 * | 4/2006 | Voas et al. | 714/47.3 |
| 7,173,931 B2 | 2/2007 | Chao et al. | |
| 7,230,947 B1 | 6/2007 | Huber et al. | |
| 7,233,568 B2 | 6/2007 | Goodman et al. | |
| 7,245,629 B1 | 7/2007 | Yip et al. | |
| 7,248,760 B1 | 7/2007 | Corbalis et al. | |
| 7,277,429 B2 | 10/2007 | Norman et al. | |
| 7,289,513 B1 | 10/2007 | Medved et al. | |
| 7,315,897 B1 | 1/2008 | Hardee et al. | |
| 7,330,467 B2 | 2/2008 | Sharma | |
| 7,369,561 B2 | 5/2008 | Wybenga et al. | |
| 7,406,038 B1 | 7/2008 | Oelke et al. | |
| 7,408,927 B2 | 8/2008 | George | |
| 7,415,034 B2 | 8/2008 | Muller et al. | |
| 7,415,627 B1 | 8/2008 | Radhakrishnan et al. | |
| 7,428,219 B2 | 9/2008 | Khosravi | |
| 7,437,469 B2 | 10/2008 | Ellanti et al. | |
| 7,466,703 B1 | 12/2008 | Arunachalam et al. | |
| 7,471,676 B2 | 12/2008 | Wybenga et al. | |
| 7,596,614 B2 | 9/2009 | Saunderson et al. | |
| 7,630,373 B2 | 12/2009 | Okuno | |
| 7,664,123 B2 | 2/2010 | Ashwood Smith et al. | |
| 7,675,912 B1 | 3/2010 | Ward et al. | |
| 7,702,765 B1 | 4/2010 | Raszuk | |
| 7,715,382 B2 | 5/2010 | Lakshman et al. | |
| 7,733,856 B2 * | 6/2010 | Hongal et al. | 370/389 |
| 7,746,799 B2 | 6/2010 | Kokot et al. | |
| 7,792,993 B1 | 9/2010 | Hopprich et al. | |
| 7,860,097 B1 | 12/2010 | Lovett et al. | |
| 7,877,483 B1 | 1/2011 | Finn | |
| 8,059,680 B2 * | 11/2011 | Minami et al. | 709/250 |
| 8,089,904 B2 | 1/2012 | Balasubramaniam et al. | |
| 8,175,079 B2 | 5/2012 | Alapuranen et al. | |
| 2002/0009078 A1 | 1/2002 | Wilson et al. | |
| 2002/0051450 A1 | 5/2002 | Ganesh et al. | |
| 2003/0039212 A1 | 2/2003 | Lloyd et al. | |
| 2004/0023558 A1 | 2/2004 | Fowler et al. | |
| 2004/0034702 A1 | 2/2004 | He | |
| 2004/0039820 A1 | 2/2004 | Colby et al. | |
| 2004/0054866 A1 | 3/2004 | Blumenau et al. | |
| 2004/0064559 A1 | 4/2004 | Kupst et al. | |
| 2004/0076151 A1 | 4/2004 | Fant et al. | |
| 2004/0254909 A1 | 12/2004 | Testa | |
| 2005/0129017 A1 | 6/2005 | Guingo et al. | |
| 2005/0138346 A1 | 6/2005 | Cauthron | |
| 2005/0180438 A1 | 8/2005 | Ko et al. | |
| 2005/0193114 A1 | 9/2005 | Colby et al. | |
| 2005/0232258 A1 | 10/2005 | Wybenga et al. | |
| 2005/0267959 A1 | 12/2005 | Monga et al. | |
| 2006/0005185 A1 | 1/2006 | Nguyen | |
| 2006/0092975 A1 | 5/2006 | Ansari et al. | |
| 2006/0164199 A1 | 7/2006 | Gilde et al. | |
| 2006/0165085 A1 | 7/2006 | Konda | |
| 2006/0198321 A1 | 9/2006 | Nadeau et al. | |
| 2007/0036178 A1 | 2/2007 | Hares et al. | |
| 2007/0073882 A1 | 3/2007 | Brown et al. | |
| 2007/0106807 A1 * | 5/2007 | Hegde et al. | 709/230 |
| 2007/0115918 A1 | 5/2007 | Bodin et al. | |
| 2007/0136489 A1 | 6/2007 | Temoshenko et al. | |
| 2007/0153462 A1 | 7/2007 | Crippen et al. | |
| 2007/0283045 A1 | 12/2007 | Nguyen et al. | |
| 2008/0031151 A1 | 2/2008 | Williams | |
| 2008/0086768 A1 | 4/2008 | Mirza-Baig | |
| 2008/0089323 A1 | 4/2008 | Elias et al. | |
| 2008/0112133 A1 | 5/2008 | Torudbakken et al. | |
| 2008/0126788 A1 | 5/2008 | Kreek et al. | |
| 2008/0130517 A1 | 6/2008 | Lee et al. | |
| 2008/0151863 A1 | 6/2008 | Lawrence et al. | |
| 2008/0165704 A1 | 7/2008 | Marchetti et al. | |
| 2008/0186875 A1 | 8/2008 | Kitani | |
| 2008/0192648 A1 | 8/2008 | Galles | |
| 2008/0214059 A1 | 9/2008 | Rothermel et al. | |
| 2008/0219184 A1 | 9/2008 | Fowler et al. | |
| 2008/0320117 A1 | 12/2008 | Johnsen et al. | |
| 2009/0049191 A1 | 2/2009 | Tolliver | |
| 2009/0109963 A1 | 4/2009 | Tanizawa et al. | |
| 2009/0213779 A1 | 8/2009 | Zhang et al. | |
| 2009/0219830 A1 | 9/2009 | Venner et al. | |
| 2009/0271851 A1 | 10/2009 | Hoppe et al. | |
| 2009/0304010 A1 | 12/2009 | Kurebayashi et al. | |
| 2009/0328024 A1 | 12/2009 | Li et al. | |
| 2010/0002382 A1 | 1/2010 | Aybay et al. | |
| 2010/0002714 A1 * | 1/2010 | George et al. | 370/402 |
| 2010/0091779 A1 | 4/2010 | Juhl et al. | |
| 2010/0097926 A1 | 4/2010 | Huang et al. | |
| 2010/0165876 A1 | 7/2010 | Shukla et al. | |
| 2010/0165877 A1 | 7/2010 | Shukla et al. | |
| 2010/0169467 A1 | 7/2010 | Shukla et al. | |
| 2010/0182933 A1 | 7/2010 | Hu et al. | |
| 2010/0214949 A1 | 8/2010 | Smith et al. | |
| 2010/0265832 A1 | 10/2010 | Bajpay et al. | |
| 2010/0306408 A1 | 12/2010 | Greenberg et al. | |
| 2011/0069706 A1 * | 3/2011 | Sen et al. | 370/392 |
| 2011/0161468 A1 | 6/2011 | Tuckey et al. | |
| 2012/0033665 A1 | 2/2012 | Jacob Da Silva et al. | |
| 2012/0069842 A1 | 3/2012 | Reddy et al. | |
| 2012/0093154 A1 | 4/2012 | Rosenberg et al. | |
| 2012/0128004 A1 | 5/2012 | Aybay et al. | |
| 2012/0155320 A1 | 6/2012 | Vohra et al. | |
| 2012/0155453 A1 | 6/2012 | Vohra | |
| 2012/0158942 A1 | 6/2012 | Kalusivalingam et al. | |
| 2012/0189009 A1 | 7/2012 | Shekhar et al. | |

FOREIGN PATENT DOCUMENTS

| | | |
|---|---|---|
| EP | 1 892 905 A1 | 2/2008 |
| EP | 1 924 030 A1 | 5/2008 |
| EP | 2 164 209 A1 | 3/2010 |
| EP | 2 413 550 A1 | 7/2011 |
| EP | 2 369 782 A1 | 9/2011 |
| EP | 2 456 138 A1 | 5/2012 |
| EP | 2 466 825 A1 | 6/2012 |
| EP | 2 466 826 A1 | 6/2012 |
| GB | 2 362 289 A | 11/2001 |
| WO | WO 00/08801 | 2/2000 |
| WO | WO 2008/144927 A1 | 12/2008 |

OTHER PUBLICATIONS

K. Kompella et al., "Virtual Private LAN Service (VPLS) Using BGP for Auto-Discovery and Signaling" [online], Retrieved from the Internet: <URL: http://www.ietf.org/rfc/rfc4761.txt>, Jan. 2007, 27 pages.

Cisco Systems, Inc., "Intermediate System-to-Intermediate System (IS-IS) TLVs" Document ID: 5739 [online], Retrieved from the Internet: <URL: http://www.cisco.com/en/US/tech/tk365/technologies_tech_note09186a0080094bbd.shtml>, Aug. 10, 2005, 8 pages.

U.S. Appl. No. 12/345,498, filed Dec. 29, 2008, entitled "Control Plane Architecture for Switch Fabrics".

Office Action for U.S. Appl. No. 12/345,498, mailed Apr. 28, 2010.

Final Office Action for U.S. Appl. No. 12/345,498, mailed Oct. 26, 2010.

U.S. Appl. No. 12/415,504, filed Mar. 31, 2009, entitled "Methods and Apparatus for Dynamic Automated Configuration Within a Control Plane of a Switch Fabric".

Office Action for U.S. Appl. No. 12/415,504, mailed Apr. 30, 2012.

Final Office Action for U.S. Appl. No. 12/415,504, mailed Oct. 10, 2012.

Office Action for U.S. Appl. No. 13/053,801, mailed Dec. 6, 2012.

(56) References Cited

OTHER PUBLICATIONS

U.S. Appl. No. 12/968,846, filed Dec. 15, 2010, entitled "Host Side Protocols for Use With Distributed Control Plane of a Switch".
Office Action for U.S. Appl. No. 12/968,846, mailed Oct. 31, 2012.
U.S. Appl. No. 12/977,585, filed Dec. 23, 2010, entitled "Network Management Configuration for Retrieving and Aggregating Status Information From Resources Distributed Across a Network".
Office Action for U.S. Appl. No. 12/977,585, mailed Sep. 13, 2012.
U.S. Appl. No. 12/968,769, filed Dec. 15, 2010 entitled "Systems and Methods for Automatically Detecting Network Elements".
Office Action mailed Oct. 22, 2012 for U.S. Appl. No. 12/968,769, filed Dec. 15, 2010.
U.S. Appl. No. 12/976,075, filed Dec. 22, 2010 entitled Deriving Control Plane Connectivity During Provisioning of a Distributed Control Plane of a Switch.
Office Action mailed Nov. 7, 2012 for U.S. Appl. No. 12/968,886, filed Dec. 10, 2010.
U.S. Appl. No. 12/968,957, filed Dec. 15, 2010 entitled "Methods and Apparatus for Virtualizing Switch Control Plane Engine".
Office Action mailed Jul. 30, 2012 for U.S. Appl. No. 12/968,957, filed Dec. 10, 2010.
Office Action mailed Sep. 17, 2012 for U.S. Appl. No. 12/951,706, mailed Sep. 17, 2012.
U.S. Appl. No. 13/435,919, filed Mar. 30, 2012, entitled "Methods and Apparatus for Virtualizing Switch Control Plane Engine".
Extended Search Report for European Application No. 11158837.2, mailed Jun. 21, 2011.
Extended Search Report for European Application No. 11179603.3, mailed Dec. 21, 2011, 8 pages.
Extended Search Report for European Application No. 11192571.5, mailed Mar. 19, 2012.
Extended Search Report for European Application No. 11192565.7, mailed Mar. 30, 2012, 6 pages.
Extended Search Report for European Application No. 11174003.1, mailed Feb. 8, 2012.
Extended Search Report for European Application No. 11175433.9, mailed Oct. 7, 2011, 7 pages.
Office Action mailed Mar. 14, 2013 for U.S. Appl. No. 13/197,212, filed Aug. 3, 2011.
U.S. Appl. No. 13/342,277, filed Dec. 22, 2011, entitled "Methods and Apparatus for Using Border Gateway Protocol (BGP) for Converged Fibre Channel (FC) Control Plane".
U.S. Appl. No. 13/333,031, filed Dec. 21, 2011, entitled "Methods and Apparatus for a Distributed Fibre Channel Control Plane".
U.S. Appl. No. 13/197,212, filed Aug. 3, 2011, entitled "Methods and Apparatus for Route Installation Acknowledgement and Acknowledgement Aggregation in BGP".
Office Action mailed Mar. 25, 2013 for U.S. Appl. No. 12/969,277, filed Dec. 15, 2010.
U.S. Appl. No. 13/333,039, filed Dec. 21, 2011, entitled "Methods and Apparatus for a Distributed Fibre Channel Control Plane".

* cited by examiner

400 ⟶

| Destination ID 410 | Payload 420 |

| Access Switch ID 510 | DPM ID 520 | Next Hop Ref 530 | Destination ID 410 | Payload 420 |

| Next Hop ID 620 | Destination ID 410 | Payload 420 |

FIG. 7

| Database 1000 | | | |
|---|---|---|---|
| Final Destination ID 1010 | Access Switch ID 1020 | DPM ID 1030 | Next Hop Ref 1040 |
| FD_1 | AS_5 | DPM_1 | NH_1 |
| FD_2 | AS_10 | DPM_2 | NH_5 |
| FD_3 | AS_2 | DPM_3 | NH_5 |
| FD_4 | AS_5 | DPM_1 | NH_2 |
| FD_5 | AS_2 | DPM_3 | NH_2 |
| FD_6 | AS_5 | DPM_2 | NH_1 |
| ⋮ | | | |
| FD_N | AS_M | DPM_2 | NH_L |

METHODS AND APPARATUS FOR MANAGING NEXT HOP IDENTIFIERS IN A DISTRIBUTED SWITCH FABRIC SYSTEM

RELATED APPLICATION

This application claims priority to, and the benefit of U.S. Provisional Patent Application Ser. No. 61/316,720, filed on Mar. 23, 2010, and entitled "Methods And Apparatus Related To Distributed Control Plane Switch Management."

BACKGROUND

Some embodiments described herein relate generally to distributed switch fabric systems, and, in particular, to managing next hop identifiers in a distributed switch fabric system.

Some known networking systems include a centralized control plane that can manage resources connected to and/or part of the networking system. For example, the centralized control plane can maintain a database associated with the physical location of the resources. Additionally, the centralized control plane can manage forwarding-state information associated with the resources. Such a centralized control plane, however, can become extremely large and unmanageable when a large number of resources are connected to the networking system.

Accordingly, a need exists for a networking system having a distributed control plane that efficiently manages the forwarding-state information of the resources to which it is coupled.

SUMMARY

In some embodiments, an apparatus implemented in a memory and/or a processing device includes a first network control entity to manage a first data plane module associated with a port from a set of ports at a first access switch. The first network control entity associates an identifier of a peripheral processing device operatively coupled to the port from the set of ports with a next hop reference. The first network control entity provides the next hop reference to a second network control entity that manages a second data plane module at a second access switch such that the second data plane module can append the next hop reference to a data packet when the peripheral processing device is within a data path between and including the second access switch and a destination peripheral processing device.

BRIEF DESCRIPTION OF THE DRAWINGS

FIGS. 5-7 are illustrations of data packets, according to another embodiment.

DETAILED DESCRIPTION

Figure 1:
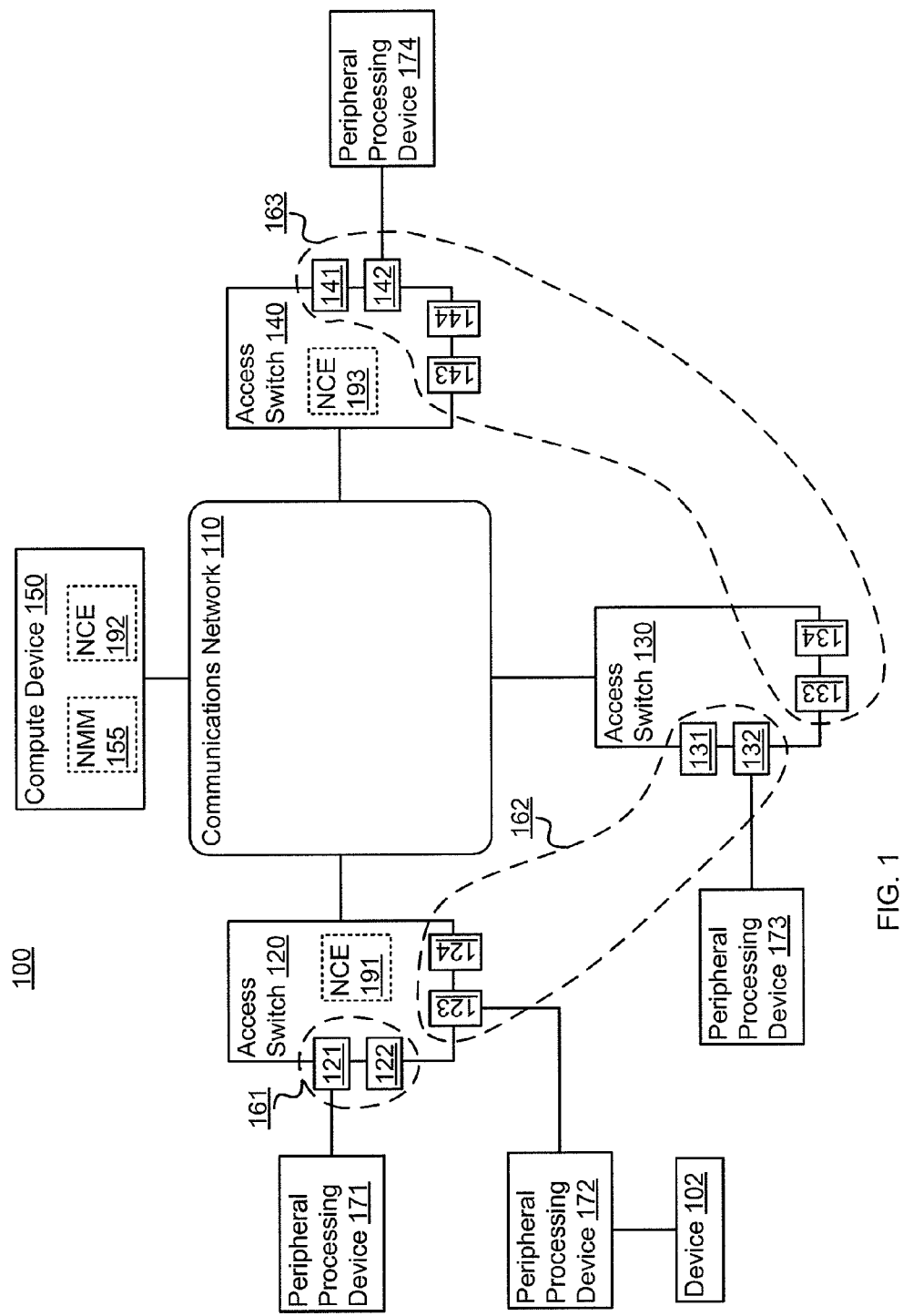
FIG. 1 is a schematic illustration of a switch fabric system, according to an embodiment.

In some embodiments, an apparatus implemented in a memory and/or a processing device includes a first network control entity to manage a first data plane module associated with a port from a set of ports at a first access switch. The first network control entity associates an identifier of a peripheral processing device operatively coupled to the port from the set of ports with a next hop reference. The first network control entity provides the next hop reference to a second network control entity that manages a second data plane module at a second access switch such that the second data plane module can append the next hop reference to a data packet when the peripheral processing device is within a data path between and including the second access switch and a destination peripheral processing device.

In some embodiments, the next hop reference uniquely identifies the peripheral processing device to the first network control entity and the first data plane module but not the second network control entity and the second data plane module. As such, the next hop reference is not a global (i.e., system-wide) reference to the peripheral processing device, but instead a local (i.e., network-control-entity specific) reference to the peripheral processing device. Such a local reference can be associated with the identifier of the peripheral processing device at the network control entity such that the first data plane module can retrieve the identifier of the peripheral processing device when a data packet with the next hop reference is received at the first data plane module. Because the next hop reference is a local, rather than global reference, it is smaller and uses less space in a header of a data packet. Additionally, the same next hop reference can be used by another network control entity (e.g., the second network control entity) to reference a different peripheral processing device. Accordingly, the next hop references can be reused by different network control entities.

In some embodiments, a non-transitory processor-readable medium stores code representing instructions to cause a processor to receive, at a first access switch, a data packet from a switch fabric. The data packet is sent to the switch fabric from a second access switch. The code represents instructions to cause the processor to parse a header portion of the data packet to retrieve a next hop reference. The next hop reference was appended to the data packet at the second access switch prior to being received at the first access switch. The code further represents instructions to cause the processor to retrieve, using the next hop reference, a next hop identifier of a peripheral processing device from a database that is accessible at the first access switch and that maintains an association between the next hop reference and the next hop identifier of the peripheral processing device. The code represents instructions to append the next hop identifier to the data packet and send the data packet to the peripheral processing device.

In some embodiments, a system includes a first network control entity at a first processor and a second network control entity at a second processor. The first network control entity manages a first port operatively coupled to a first peripheral processing device and a second port operatively coupled to a second peripheral processing device. The first network control entity assigns a first next hop reference to the first peripheral processing device and a second next hop reference to the second peripheral processing device. The second network control entity manages a third port operatively coupled to the first peripheral processing device and a fourth port operatively coupled to a third peripheral processing device. The second network control entity assigns the first next hop reference to the first peripheral processing device and the second next hop reference to the third peripheral processing device.

In some embodiments and/or system configurations, a network reference can be globally (i.e., system-wide) unique. For example, the first next hop reference can identify the first peripheral processing device at both the first network control entity and the second network control entity. Such a situation can occur when a peripheral processing device is operatively coupled to multiple ports controlled by different network control entities. In contrast, the second next hop reference identifies the second peripheral processing device at the first network control entity and the third peripheral processing device at the second network control entity.

Embodiments shown and described herein are often discussed in reference to multiple layers (e.g., data link layer, network layer, physical layer, application layer, etc.). Such layers can be defined by open systems interconnection (OSI) model. Accordingly, the physical layer can be a lower level layer than the data link layer. Additionally, the data link layer can be a lower level layer than the network layer and the application layer. Further, different protocols can be associated with and/or implemented at different layers within the OSI model. For example, an Ethernet protocol, a Fibre Channel protocol and/or a cell-based protocol (e.g., used within a data plane portion of a communications network) can be associated with and/or implemented at a data link layer, while a Border Gateway Protocol (BGP) can be associated with and/or implemented at a higher layer, such as, for example, an application layer. While BGP can be implemented at the application layer, it can be used, for example, to send forwarding-state information used to populate a routing table associated with a network layer.

As used herein, the term "physical hop" can include a physical link between two modules and/or devices. For example, a communication path operatively coupling a first module with a second module can be said to be a physical hop. Similarly stated, a physical hop can physically link the first module with the second module.

As used herein, the term "single physical hop" can include a direct physical connection between two modules and/or devices in a system. Similarly stated, a single physical hop can include a link via which two modules are coupled without intermediate modules. Accordingly, for example, if a first module is coupled to a second module via a single physical hop, the first module can send data packets directly to the second module without sending the data packets through intervening modules.

As used herein, the term "single logical hop" means a physical hop and/or group of physical hops that are a single hop within a network topology associated with a first protocol (e.g., a first data link layer protocol). Similarly stated, according to the network topology associated with the first protocol, no intervening nodes exist between a first module and/or device operatively coupled to a second module and/or device via the physical hop and/or the group of physical hops. A first module and/or device connected to a second module and/or device via a single logical hop can send a data packet to the second module and/or device using a destination address associated with the first protocol and the second module and/or device, regardless of the number of physical hops between the first device and the second device. In some embodiments, for example, a second protocol (e.g., a second data link layer protocol) can use the destination address of the first protocol (e.g., the first data link layer protocol) to route a data packet and/or cell from the first module and/or device to the second module and/or device over the single logical hop. Similarly stated, when a first module and/or device sends data to a second module and/or device via a single logical hop of a first protocol, the first module and/or device treats the single logical hop as if it is sending the data directly to the second module and/or device. In some embodiments, for example, the first protocol can be a packet-based data link layer protocol (i.e., that transmits variable length data packets and/or frames) and the second protocol can be a cell-based data link layer protocol (i.e., that transmits fixed length data cells and/or frames).

In some embodiments, a switch fabric can function as part of a single logical hop (e.g., a single large-scale consolidated layer-2 (L2)/layer-3 (L3) switch). Portions of the switch fabric can be physically distributed across, for example, many chassis and/or modules interconnected by multiple physical hops. In some embodiments, for example, a processing stage of the switch fabric can be included in a first chassis and another processing stage of the switch fabric can be included in a second chassis. Both of the processing stages can logically function as part of a single consolidated switch (e.g., within the same logical hop according to a first protocol) but include a separate single physical hop between respective pairs of processing stages. Similarly stated, each stage within a switch fabric can be connected to adjacent stage(s) by physical links while operating collectively as a single logical hop associated with a protocol used to route data outside the switch fabric. Additionally, packet classification and forwarding associated with a protocol (e.g., Ethernet) used to route data outside a single logical hop need not occur at each stage within the single logical hop. In some embodiments, for example, packet classification and forwarding associated with a first protocol (e.g., Ethernet) can occur prior to a module and/or device sending the data packet to another module and/or device via the single logical hop.

As used in this specification, the singular forms "a," "an" and "the" include plural referents unless the context clearly dictates otherwise. Thus, for example, the term "a module" is intended to mean a single module or a combination of modules.

FIG. 1 is a schematic diagram that illustrates a switch fabric system 100, according to an embodiment. The switch fabric system 100 includes a communications network 110, multiple access switches 120, 130, 140, a compute device 150 and multiple peripheral processing devices 171-174 and can function as a distributed network switch. The peripheral processing devices 171-174 are operatively coupled to each other by remaining portions of the switch fabric system 100. The peripheral processing devices 171-174 can be, for example, compute nodes, service nodes, routers, and storage nodes, as described in further detail herein. In some embodiments, for example, the peripheral processing devices 171-174 include servers, storage devices, gateways, workstations, compute devices and/or the like.

The peripheral processing devices 171-174 can be operatively coupled to one or more ports 121-124, 131-134, 141-144 of the access switches 120, 130, 140 using any suitable connection such as, for example, an optical connection (e.g., an optical cable and optical connectors), an electrical connection (e.g., an electrical cable and electrical connectors) and/or the like. Similarly stated, each port 121-124, 131-134, 141-144 provides a communication interface through which a peripheral processing device 171-174 can be operatively coupled to a data plane module (not shown in FIG. 1) of an access switch 120, 130, 140, as described in further detail herein. As such, the peripheral processing devices 171-174 are configured to send data (e.g., data packets, data cells, etc.) to and receive data from the data plane modules of the access switches 120, 130, 140. In some embodiments, each connection between the peripheral processing devices 171-174 and the respective access switches 120, 130, 140 is a direct link. Such a link can be said to be a single physical hop link. In other embodiments, the peripheral processing devices can be operatively coupled to the access switches via intermediate modules. Such a connection can be said to be a multiple physical hop link.

Each access switch 120, 130, 140 can be any device that operatively couples peripheral processing devices 171-174 to the communications network 110. In some embodiments, for example, the access switches 120, 130, 140 can be edge devices, input/output modules, top-of-rack devices, network elements and/or the like. Each access switch 120, 130, 140 can be physically located with a chassis of the switch fabric system 100. In some embodiments, for example, each access switch 120, 130, 140 can be located with the same chassis. In other embodiments, each access switch 120, 130, 140 can be located with a different chassis. Structurally, the access switches 120, 130, 140 can function as both source access switches and destination access switches. Accordingly, the access switches 120, 130, 140 can send data (e.g., a data stream of data packets and/or data cells) to and receive data from a data plane portion of the communications network 110, and to and from the respective connected peripheral processing devices 171-174.

Each of the access switches 120, 130, 140 includes at least one data plane module (not shown in FIG. 1) that communicates with data plane modules at the other access switches 120, 130, 140 via a data plane portion of the communications network 110. Specifically, the data plane portion of the communications network 110 can provide any-to-any connectivity between the data plane modules of the access switches 120, 130, 140 at relatively low latency. For example, the data plane portion of the communications network 110 can transmit (e.g., convey) data between the data plane modules of the access switches 120, 130, 140. In some embodiments, the communications network 110 can have at least hundreds or thousands of ports (e.g., egress ports and/or ingress ports) through which access switches 120, 130, 140 can transmit and/or receive data.

Each data plane module can be an application specific integrated circuit (ASIC), a field programmable gate array (FPGA), a programmable logic devices (PLD) and/or another hardware module at an access switch 120, 130, 140. In other embodiments, each data plane module can be a process, application, virtual machine, and/or some other software module (executing in hardware) at an access switch 120, 130, 140. In such embodiments, instructions that implement the data plane modules can be stored within a memory of an access switch 120, 130, 140 (e.g., memory 252 shown in FIG. 2) and executed at a processor of an access switch 120, 130, 140 (e.g., processor 251 shown in FIG. 2).

In some embodiments, each data plane module stores a database that includes an association between next hop references of peripheral processing devices 171-174 associated with that data plane module and next hop identifiers of those peripheral processing device 171-174. A next hop identifier of a peripheral processing device 171-174 can be any identifier that uniquely identifies the peripheral processing device 171-174 within the switch fabric system 100. Thus, a next hop identifier can be said to be globally unique within the switch fabric system 100. Accordingly, if the peripheral processing device 171 has a next hop identifier of 12345, no other peripheral processing device 172-174 has a next hop identifier of 12345. In some embodiments, for example, the next hop identifier can be a media access control (MAC) address, an interne protocol (IP) address and/or another suitable address of a peripheral processing devices 171-174.

A next hop reference of a peripheral processing device 171-174 can be any identifier that uniquely identifies a peripheral processing device within a network control entity 191-193 (described in further detail herein). Similarly stated, each peripheral processing device 171-174 coupled to the ports managed and/or controlled by a same network control entity 191-193 can have a unique next hop reference. For example, if peripheral processing device 172 (coupled to port 123 that is controlled by network control entity 192) has a next hop reference of 1, the peripheral processing device 173 (coupled to port 132 that is also controlled by network control entity 192) has a next hop reference other than 1. The peripheral processing device 171 (coupled to port 121 that is controlled by network control entity 191) and the peripheral processing device 174 (coupled to port 142 that is controlled by network control entity 193), however, could both have a next hop reference of 1 because they are not controlled by the same network control entity as each other or the same network control entity as peripheral processing device 172. In some embodiments, and in certain configurations, as described in further detail herein with respect to FIGS. 9 and 10, a next hop reference of a peripheral processing device 171-174 can be globally unique within the switch fabric system 100.

Because each next hop reference is generally only unique with respect to the peripheral processing devices 171-174 associated with a single network control entity, the size of the next hop reference can be smaller than the globally unique next hop identifier. Accordingly, as described in further detail herein, appending a next hop reference to a data packet at a source access switch 120, 130, 140 does not increase the size of the data packet as much as appending a next hop identifier to the data packet would. Thus, the next hop reference is a reference that a destination data plane module (controlled by a network control entity) can use to retrieve a next hop identifier.

In some embodiments, such a database is stored locally (e.g., within the same chip package as the data plane module) by each data plane module. For example, if the data plane module is stored and/or executed on an ASIC, the database having the association between the relevant next hop identifiers and the relevant next hop references can also be stored on the ASIC. Using next hop references that are unique within each network control entity enables such a database to remain small. Additionally, because the network references can be reused among the various network control entities, the number of network references within the system remains small compared to the number of network identifiers. Additionally, because the database is stored locally, a data plane module can quickly query the database for a next hop identifier using a next hop reference as a key.

As discussed in further detail herein, the access switches 120, 130, 140 can be configured to host one or more network control entities to manage the data plane modules and/or ports 121-124, 131-134, 141-144 of the access switches 120, 130, 140. For example, as described in further detail herein, the access switch 120 can host the network control entity 191 to manage the group of ports 161, and the access switch 140 can host the network control entity 193 to manage the group of ports 163. Similarly stated, the network control entity 191 and the network control entity 193 can be processes, applications, virtual machines, and/or some other software module (executing in hardware) or a hardware module that is executed at the access switch 120 and the access switch 140, respectively. As discussed in further detail herein, compute device 150 hosts the network control entity 192 to manage the group of ports 162.

Figure 2:
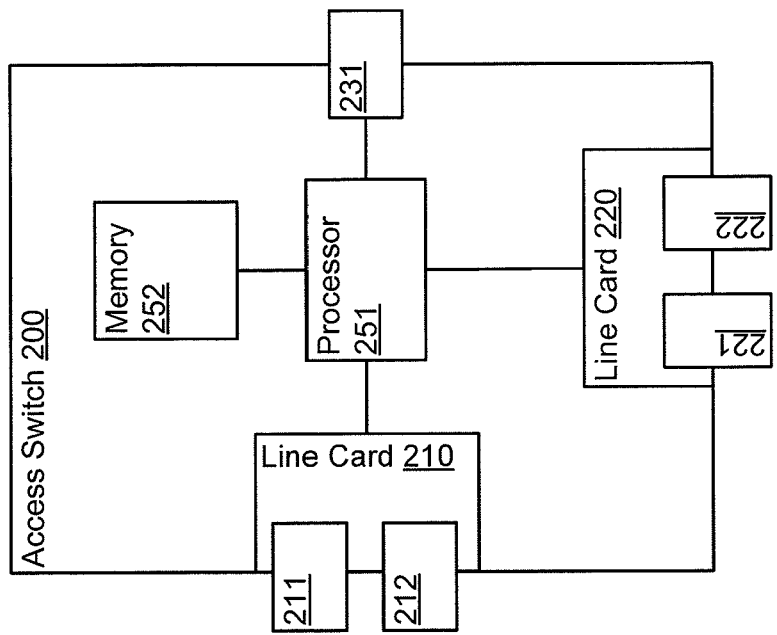
FIG. 2 is a schematic illustration of an access switch of a switch fabric system, according to another embodiment.

FIG. 2 is a system block diagram of an access switch 200 similar to the access switches 120, 130, 140. The access switch 200 includes processor 251, memory 252, line card 210, line card 220, and port 231. Processor 251 is operatively coupled to memory 252, line card 210, line card 220 and port 231. Line card 210 includes ports 211 and 212. Line card 220 includes ports 221 and 222. In some embodiments, line cards 210 and/or 220 include one or more processors and/or memories (not shown).

Similar to the ports 121-124, 131-134, 141-144 of the access switches 120, 130, 140 shown in FIG. 1, ports 211, 212, 221 and 222 can communicate with peripheral processing devices. For example, ports 211, 212, 221 and 222 can implement a physical layer using twisted-pair electrical signaling via electrical cables or fiber-optic signaling via fiber-optic cables. In some embodiments, some of ports 211, 212, 221 and 222 implement one physical layer such as twisted-pair electrical signaling and others of ports 211, 212, 221 and 222 implement a different physical layer such as fiber-optic signaling. Furthermore, ports 211, 212, 221 and 222 can allow the data plane modules of the access switch 200 to communicate with peripheral processing devices, such as, for example, computer servers (servers), via a common protocol such as Ethernet or Fibre Channel. In some embodiments, some of ports 211, 212, 221 and 222 implement one protocol such as Ethernet and others of ports 211, 212, 221 and 222 implement a different protocol such as Fibre Channel. Thus, access switch 200 can be in communication with multiple peripheral processing devices using homogeneous or heterogeneous physical layers and/or protocols via ports 211, 212, 221 and 222.

Port 231 can be in communication with other access switches via a communications network such as a switch fabric (e.g., communications network 110). Port 231 can be part of one or more network interface devices (e.g., a 40 Gigabit (Gb) Ethernet interface, a 100 Gb Ethernet interface, etc.) through which the access switch 200 can send signals to and/or receive signals from a communications network. The signals can be sent to and/or received from the communications network via an electrical link, an optical link and/or a wireless link operatively coupled to the access switch 200. In some embodiments, the access switch 200 can send signals to and/or receive signals from the communications network based on one or more protocols (e.g., an Ethernet protocol, a multi-protocol label switching (MPLS) protocol, a Fibre Channel protocol, a Fibre-Channel-over Ethernet protocol, an Infiniband-related protocol).

In some embodiments, port 231 can implement a different physical layer and/or protocol than those implemented at ports 211, 212, 221 and 222. For example, port 211, 212, 221 and 222 can communicate with peripheral processing devices using a data link layer protocol based on data packets, and port 231 can communicate via a switch fabric using a data link layer protocol based on data cells. Said differently, access switch 200 can be an edge device of a network switch such as a distributed network switch.

In some embodiments, the access switch 200 can prepare a data packet (e.g., an Ethernet frame and/or packet) to enter a data plane portion of a communications network (e.g., communications network 110). In some embodiments, for example, the access switch 200 can include one or more data plane modules (not shown in FIG. 2) to forward, classify, and/or modify the packet encapsulation (e.g., modify, add and/or remove a header portion, footer portion and/or any other identifier included within the data packet) of a data packet received from a peripheral processing device operatively coupled to a port 211, 212, 221, 222 of the access switch 200 prior to sending the data packet to the communications network. Additionally, a data plane module at the access switch 200 can be configured to partition and/or divide the data packet into data cells (e.g., having fixed length payloads) prior to sending the data cells to the switch fabric. Additional details related to packet classification are described in U.S. patent application Ser. No. 12/242,168 entitled "Methods and Apparatus Related to Packet Classification Associated with a Multi-Stage Switch," filed Sep. 30, 2008, and U.S. patent application Ser. No. 12/242,172, entitled "Methods and Apparatus for Packet Classification Based on Policy Vectors," filed Sep. 30, 2008, both of which are incorporated herein by reference in their entireties.

Returning to FIG. 1, the compute device 150 can be configured to host management modules, processes and/or functions associated with the switch fabric system 100. As shown in FIG. 1, and as described in further detail herein, the compute device 150 can be configured to host a network management module 155 and a network control entity 192.

Figure 3:
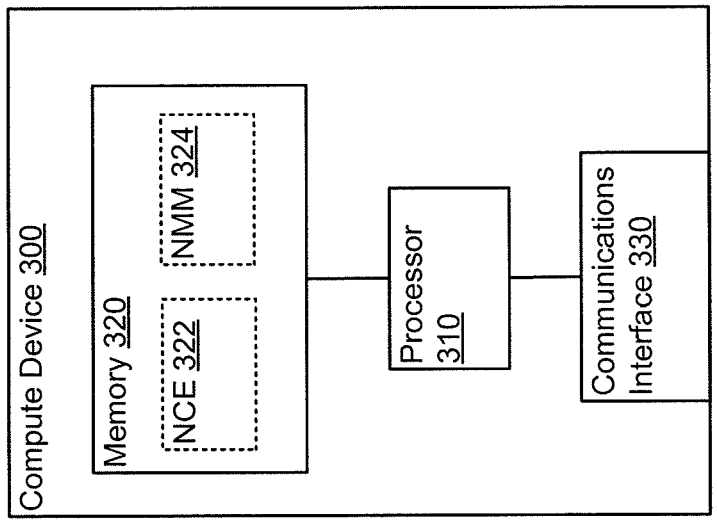
FIG. 3 is a schematic illustration of a compute device of a switch fabric system, according to another embodiment.

FIG. 3 is a system block diagram of a compute device 300 substantially similar to the compute device 150, according to an embodiment. Compute device 300 includes processor 310, memory 320, and communications interface 330. Processor 310 is operatively coupled to memory 320 and communications interface 330. Compute device 300 can communicate with other compute devices, peripheral processing devices and/or access switches via communications interface 330.

As illustrated in FIG. 3, compute device 300 can host a network control entity 322 and a network management module 324 similar to the network control entity 194 and the network management module 155, respectively. In other words, network control entity 322 and network management module 324 can be processes, applications, virtual machines, and/or some other software module (executing in hardware) or a hardware module that is executed at compute device 300. In some embodiments, for example, instructions that implement network control entity 322 and/or network management module 324 can be stored at memory 320 and executed at processor 310.

In some embodiments, compute device 300 can be dedicated to hosting network control entity 322 and/or network management module 324. In other words, compute device 300 can allocate all or substantially all of its computing resources (e.g., processing capacity and memory) to network control entity 322 and/or network management module 324. In some embodiments, compute device 300 can host other processes, applications, virtual machines, and/or software modules (executing in hardware) in addition to network control entity 322 and/or network management module 324. For example, compute device 300 can be a general purpose compute device or compute node that is configured to host multiple processes, applications, virtual machines, and/or software modules.

Returning to FIG. 1, the network management module 155 can divide and/or partition the ports 121-124, 131-134, 141-144 of the access switches 120, 130, 140 into the groups of ports 161, 162, 163 to be managed by network control entities 191-193. As such, the network management module 155 can associate the group of ports 161 with the network control entity 191, the group of ports 162 with the network control entity 192 and the group of ports 163 with the network control entity 193. Additionally, the network management module 155 can assign each data plane module at the access switches to a network control entity 191-193. In some embodiments, a data plane module and its associated ports 121-124, 131-134, 141-144 can be assigned to a same network control entity 191-193, as described in further detail herein. Similarly stated, in such embodiments, a same network control entity 191-193 controls and/or manages a data plane module and its associated ports 121-124, 131-134, 141-144.

In some embodiments, the network management module 155 can also monitor an available processing capacity of each network control entity 191-193 and initiate and/or terminate network control entities 191-193 when the available processing capacity of a network control entity 191-193 crosses (e.g., falls below) a first threshold and/or crosses (e.g., exceeds) a second threshold, respectively. Such initiation and termination of network control entities can be similar to that described in co-pending U.S. patent application Ser. No. 12/968,848, filed on Dec. 15, 2010, and entitled "Methods and Apparatus for Dynamic Resource Management within a Distributed Control Plane of a Switch," which is incorporated herein by reference in its entirety.

In some embodiments, the network management module 155 can store (e.g., in a memory) a configuration file associated with configuration information (e.g., port protocol information, network segment assignment information, port assignment information, peripheral processing device information, etc.) and/or associated with forwarding-state information (e.g., port identifiers, network segment identifiers, peripheral processing device identifiers, access switch identifiers, data plane module identifiers, next hop references, next hop identifiers, etc.) associated with the switch fabric system 100.

Figures 8, 9:
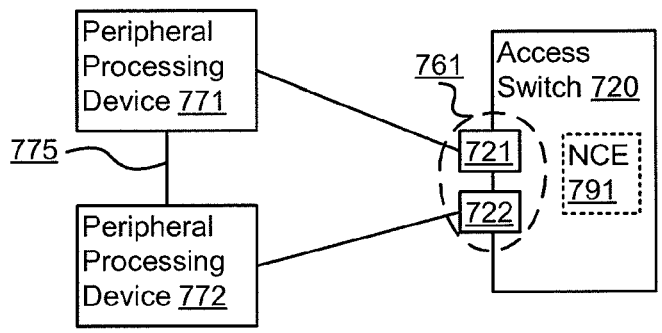
FIG. 8 is an illustration of a database relating final destination identifiers to next hop references, according to another embodiment.
FIGS. 9-11 are schematic illustrations of portions of switch fabric systems, according to other embodiments.

In some embodiments, the configuration file can include an association between a final destination identifier and a next hop reference. FIG. 8 illustrates a database 1000 associating next hop references with final destination identifiers. The database 1000 includes a final destination ID column 1010, an access switch ID column 1020, a data plane module (DPM) ID column 1030 and a next hop reference column 1040. As described in further detail herein, such a database 1000 can be used by a data plane module in preparing a data packet and/or data cell to be sent to another data plane module via the data plane portion of the communications network 110. More specifically, a source data plane module can query such a database 1000 using a final destination identifier within a header portion of a data packet (see e.g., FIGS. 5-7) as a reference and/or key to the final destination ID column 1010. As such, using the destination identifier, the data plane module can retrieve a corresponding value from the access switch ID column 1020, a corresponding value from the data plane module ID column 1030 and a corresponding value from the next hop reference column 1040 associated with a destination peripheral processing device 171-174.

In some embodiments, the network management module 155 can send a portion of the configuration information and/or forwarding-state information associated with a group of ports 161, 162, 163 managed by a particular network control entity 191-193 to that network control entity 191-193. For example, the network management module 155 can send a portion of the configuration file associated with the group of ports 161 to the network control entity 191. The network control entities 191-193 can then send a portion of the configuration file to the data plane modules. For example, if data plane module 181 (FIG. 4) is associated with port 121, the portion of the configuration file pertaining to port 121 and/or the peripheral processing device 171 can be sent to the data plane module 181. Similarly, if data plane module 182 (FIG. 4) is associated with port 122, the portion of the configuration file pertaining to port 122 and/or the peripheral processing device to which it is coupled can be sent to the data plane module 182. In such embodiments, the portion of the configuration file pertaining to port 121 and/or the peripheral processing device 171 is not sent to the data plane module 182 and the portion of the configuration file pertaining to port 122 and/or the peripheral processing device to which it is coupled is not sent to the data plane module 181.

As discussed above, the access switches 120, 130, 140 and/or the compute device 150 can be configured to host network control entities 191, 192, 193 that manage the data plane modules and/or the ports 121-124, 131-134, 141-144 of the access switches 120, 130, 140. Each network control entity 191-193 can be a process, application, virtual machine, and/or some other software module (executing in hardware) or a hardware module executed at an access switch 120, 130, 140 or a compute device 150. As such, instructions that implement the network control entity 191-193 can be stored within a memory of an access switch 120, 130, 140 (e.g., memory 252) and executed at a processor of an access switch 120, 130, 140 (e.g., processor 251), or stored within a memory of a compute device 150 (e.g., memory 320) and executed at a processor of a compute device 150 (e.g., processor 310).

Each network control entity 191-193 can be configured to manage ports 121-124, 131-134, 141-144 of the access switches 120, 130, 140. For example, network control entity 191 is configured to manage the ports 121, 122 associated with the group of ports 161, network control entity 192 is configured to manage the ports 123, 124, 131, 132 associated with the group of ports 162 and network control entity 193 is configured to manage the ports 133, 134, 141, 142, 143, 144 associated with the group of ports 163. In some embodiments, each network control entity 191-193 can manage and/or maintain forwarding-state information (e.g., port identifiers, network segment identifiers, peripheral processing device identifiers, next hop references, next hop identifiers, etc.) associated with its group of ports 161, 162, 163, monitor a state and/or status of peripheral processing devices 171-174 associated with its group of ports 161, 162, 163, and/or manage and maintain other information associated with the peripheral processing devices 171-174 and/or ports 121-124, 131-134, 141-144 associated with its group of ports 161, 162, 163. Such forwarding-state information can be used to send data from a first peripheral processing device 171-174 to a second peripheral processing device 171-174. Similarly stated, such forwarding-state information can be used to route and/or forward a data packet and/or cell through access switches 120, 130, 140 and a data plane portion of the communications network 110 from a source peripheral processing device 171-174 to a destination peripheral processing device 171-174.

Each network control entity 191-193 can also be configured to assign a next hop reference to each peripheral processing device 171-174 coupled to a port 121-124, 131-134, 141-144 that network control entity 191-193 manages and/or controls. Accordingly, each network control entity 191-193 can ensure that the next hop references are unique with respect to that network control entity 191-193. Additionally, each network control entity 191-193 can send next hop references associated with a data plane module controlled by that network control entity 191-193 to that data plane module. As such, the data plane module can store an association between the next hop reference assigned by the network control entity and the next hop identifier of each peripheral processing device 171-174 with which that data plane module is associated.

In some embodiments, each network control entity 191-193 can determine with which destination devices each peripheral processing device 171-174 acts as a next hop. More specifically, each network control entity can determine what destination devices are independently coupled (e.g., not though the switch fabric system 100) to a peripheral processing device coupled to a port 121-124, 131-134, 141-144 that that network control entity 191-193 manages and/or controls. The peripheral processing device coupled to the port 121-124, 131-134, 141-144 that the network control entity 191-193 manages and/or controls can act as a next hop in a data path to a destination device. For example, the network control entity 192 can determine that the device 102 is coupled to the peripheral processing device 172 independent of the access switches 120, 130, 140 and the communications network 110 and that the peripheral processing device 172 acts as a next hop for the device 102.

Accordingly, each network control entity 191-193 can associate the next hop reference of a peripheral processing device that acts as a next hop for a destination device with the final destination identifier associated with that destination device. For example, if peripheral processing device 171 is a router and/or a gateway coupled to another device, the identifier (e.g., IP address and/or MAC address) of the other device can be the final destination identifier and can be associated with the next hop reference assigned to the peripheral processing device 171. For another example, the identifiers of the peripheral processing devices directly coupled to the ports 121-124, 131-134, 141-144 can be associated with their respective next hop references. Similarly stated, such peripheral processing devices 171-174 can act as destination devices.

In some embodiments, the network control entity 191-193 can send the association of the next hop reference and the final destination identifiers to the network management module (e.g., network management module 155 of FIG. 1) to be stored in a database (e.g., database 1000 of FIG. 8). Additionally, in some embodiments, the network control entity 191-193 can send relevant next hop information to each data plane module controlled and/or managed by that network control entity 191-193. Thus, such a database 1000 can be stored at the network management module 155 and/or the network control entities 191-193. In other embodiments, only a portion of the database 1000 is stored at each network control entity 191-193. Such a portion can include, for example, the values of the final destination identifier column 1010 and the values of the next hop reference column 1040 to which data plane modules associated with a particular network control entity send data packets and/or cells.

In some embodiments, a network control entity can control and/or manage ports and/or data plane modules at an access switch at which the network control entity is located (e.g., network control entity 191 manages the group of ports 161). In other embodiments, a network control entity can also control and/or manage ports and/or data plane modules at an access switch other than the access switch and/or compute device at which the network control entity is located (e.g., network control entity 192 manages ports 123, 124, 131 and 132). In such embodiments, the network management module 155 has flexibility to assign each port 121-124, 131-134, 141-144 and/or data plane module to a network control entity 191-193 based on processing capacity. Additionally, in such embodiments, the network management module 155 is not constrained by the physical location of the network control entities 191-193, data plane modules and/or the ports 121-124, 131-134, 141-144 when assigning the ports 121-124, 131-134, 141-144 and/or data plane modules to a network control entity 191-193.

Figure 4:
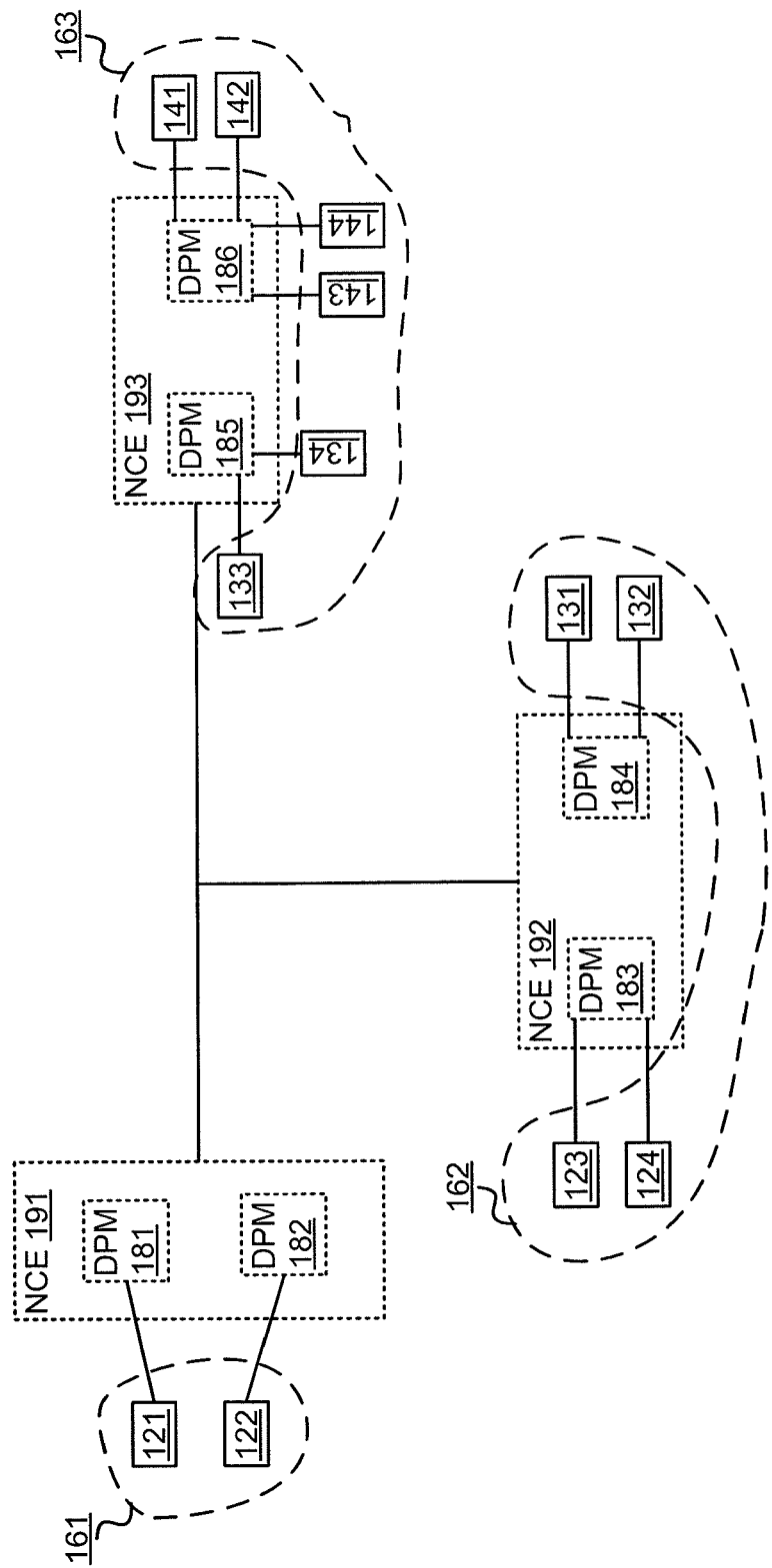
FIG. 4 is a logical representation of a control plane of the switch fabric system of FIG. 1.

FIG. 4 is a block diagram of a logical topology of a control plane of the switch fabric system 100, shown in FIG. 1. The network control entities 191-193 are logically coupled to each other within the control plane. As shown in FIG. 1, and as described in further detail herein, such connections can be through a control plane portion of the communications network 110. Thus, the network control entities 191-193 can send control information (e.g., forwarding-state information, configuration information, etc.) to each other via the control plane. For example, as described in further detail herein, network control entity 192 can send forwarding-state information associated with the group of ports 162 to the network control entity 193 via the control plane. Accordingly, the network control entities 191-193 can store and/or maintain identifiers and/or address associated with the other network control entities 191-193.

As discussed above, and as shown in FIG. 4, each network control entity 191-193 manages and/or controls at least one data plane module. For example, network control entity 191 manages and/or controls data plane modules 181 and 182, network control entity 192 manages and/or controls data plane modules 183 and 184 and network control entity 193 manages and/or controls data plane modules 185 and 186. As discussed above, each data plane module 181-186 can receive data from a peripheral processing device 171-174 (shown in FIG. 1) operatively coupled to a port 121-124, 131-134, 141-144, prepare the data, and send the data to another data plane module 181-186, via the data plane portion of the communications network 110 (shown in FIG. 1). Additionally, each data plane module 181-186 can receive data from the data plane portion of the communications network 110 and prepare the data to be sent to a peripheral processing device 171-174. As such, each data plane module 181-186 can receive and store forwarding-state information from its associated network control entity 191-193.

In some embodiments, each data plane module can be physically located at (e.g., hosted at) a same access switch 120, 130, 140 at which its associated ports are located. For example, the data plane modules 181, 182 and 183 can be associated with the ports 121, 122, and 123 and 124, respectively. Accordingly, the data plane modules 181, 182, and 183 can be physically located at the access switch 120. Similarly, the data plane modules 184, 185 and 186 can be associated with the ports 131 and 132, 133 and 134, and 141-144, respectively. Accordingly, the data plane modules 184 and 185 can be physically located at the access switch 130 and the data plane module 186 can be physically located at the access switch 140.

Returning to FIG. 1, the communications network 110 can be any suitable communications network that operatively couples the access switches 120, 130, 140 to the other access switches 120, 130, 140. Additionally, the communications network can operatively couple the compute device 150 to the access switches 120, 130, 140. In some embodiments, the communications network 110 includes a data plane portion and a control plane portion. The control plane portion of the communications network 110 facilitates transmission of control signals (e.g., containing forwarding-state information and/or configuration information) between the network control entities 191-193 and the network management module 155. Accordingly, the network control entities 191-193 can send forwarding-state information to other network control entities 191-193 via the control plane portion of the communications network 110.

The data plane portion of the communications network 110 facilitates transmission of data between the data plane modules of the access switches 120, 130, 140. In some embodiments, the data plane portion of the communications network 110 is a switch fabric having one or more stages. For example, the data plane portion of the communications network 110 can be a Clos switch fabric network (e.g., a non-blocking Clos network, a strict sense non-blocking Clos network, a Benes network) having multiple stages of switching modules (e.g., integrated Ethernet switches). Such a switch fabric can include any number of stages. In some embodiments, for example, the switch fabric can include five, seven or nine stages. The data plane portion of the communications network 110 can be, for example, part of a core portion of a data center similar to the core portion of the data center described in co-pending U.S. patent application Ser. No. 12/495,337, filed Jun. 30, 2009, and entitled "Methods and Apparatus Related to Any-to-Any Connectivity Within a Data Center," which is incorporated herein by reference in its entirety.

In some embodiments, the data plane portion of the communications network 110 can be (e.g., can function as) a single consolidated switch (e.g., a single large-scale consolidated L2/L3 switch). In other words, the data plane portion of the communications network 110 can be configured to operate as a single logical entity (e.g., a single logical network element). Similarly stated, the data plane of the communications network 110 can define part of a single logical hop between a first access switch 120, 130, 140 and a second access switch 120, 130, 140 (e.g., along with the data paths between the access switches 120, 130, 140 and the data plane portion of the communications network 110). More specifically, the data plane of the communications network 110 can define part of a single logical hop between a data plane module at a first access switch 120, 130, 140 and a data plane module at a second access switch 120, 130, 140. The data plane portion of the communications network 110 can be configured to couple (e.g., indirectly connect, facilitate communication between) the peripheral processing devices 171-174. In some embodiments, the data plane portion of the communications network 110 can be configured to communicate via interface devices (not shown) that can transmit data at a rate of at least 10 Gb/s. In some embodiments, the data plane portion of the communications network 110 can be configured to communicate via interface devices (e.g., Fibre-Channel interface devices) that can transmit data at a rate of, for example, 2 Gb/s, 4, Gb/s, 8 Gb/s, 10 Gb/s, 40 Gb/s, 100 Gb/s and/or faster link speeds.

Although the data plane portion of the communications network 110 can be logically centralized, the implementation of the data plane portion of the communications network 110 can be highly distributed, for example, for reliability. For example, portions of the data plane portion of the communications network 110 can be physically distributed across, for example, many chassis. In some embodiments, for example, a processing stage of the data plane portion of the communications network 110 can be included in a first chassis and another processing stage of the data plane portion of the communications network 110 can be included in a second chassis. Both of the processing stages can logically function as part of a single consolidated switch (e.g., within the same logical hop) but have a separate single physical hop between respective pairs of processing stages.

In use, the network management module 155, initiates network control entities 191-193 and, based on a processing capacity of the network control entities 191-193, assigns each port 121-124, 131-134, 141-144 and each data plane module 181-186 to a network control entity 191-193. As shown in FIG. 1, for example, the network management module 155 associates ports 121 and 122 (group of ports 161) with the network control entity 191; ports 123, 124, 131 and 132 (group of ports 162) with the network control entity 192; and ports 141, 142, 143, 144, 133 and 134 (group of ports 163) with the network control entity 193. As such, as shown in FIG. 4, data plane modules 181 and 182 are associated with the network control entity 191, data plane modules 183 and 184 are associated with the network control entity 192, and data plane modules 185 and 186 are associated with the network control entity 193.

The network management module 155 can send different configuration information (e.g., a configuration file) to each network control entity 191-193. In some embodiments, for example, each network control entity 191-193 can receive configuration information (e.g., port protocol information, network segment assignment information, port assignment information, peripheral processing device information, etc.) from the network management module 155 associated with its associated group of ports 161-163. For example, network control entity 191 can receive configuration information associated with the group of ports 161 (and not the groups of ports 162 and 163), network control entity 192 can receive configuration information associated with the group of ports 162 (and not the groups of ports 161 and 163), and network control entity 193 can receive configuration information associated with the group of ports 163 (and not the groups of ports 161 and 162).

Each network control entity 191-193 can assign a next hop reference to each port 121-124, 131-134, 141-144 with which it is associated and/or to each peripheral processing device 171-174 coupled to each port 121-124, 131-134, 141-144 with which it is associated. For example, the network control entity 191 can assign a next hop reference to the peripheral processing devices operatively coupled to ports 121 and 122; the network control entity 192 can assign a next hop reference to the peripheral processing devices operatively coupled to the ports 123, 124, 131, and 132; and the network control entity 193 can assign a next hop reference to the peripheral processing devices operatively coupled to the ports 133, 134 and 141-144. In some embodiments, each next hop reference can be unique and/or specific to a particular network control entity 191-193. Similarly stated, each next hop reference can uniquely identify a peripheral processing device 171-174 operatively coupled to a port 121-124, 131-134, 141-144 within a group of ports 161, 162, 163. In such embodiments, each next hop reference is not globally unique. Accordingly, while each next hop reference uniquely identifies the peripheral processing devices 171-174 to a single network control entity 191-193 (e.g., is unique within a group of ports 161-163), it is not necessarily unique across the entire switch fabric system 100. Thus, both peripheral processing device 171 and peripheral processing device 173 can have a next hop reference of "1".

Each next hop reference can be associated with a next hop identifier (e.g., a device identifier such as a MAC address and/or an IP address) of a peripheral processing device. Such an association can be stored in a database maintained by the associated network control entity 191-193 and/or the network management module 155. Additionally, each network control entity 191-193 can send the next hop references associated with the peripheral processing devices coupled to the ports associated with each data plane module 181-186 to that data plane module 181-186. Accordingly, the data plane module 181 can receive the next hop reference associated with the peripheral processing device 171 operatively coupled to the port 121 (see FIG. 1) and the data plane module 182 can receive the next hop reference associated with the peripheral processing device (not shown in FIG. 1) operatively coupled to the port 122. In some embodiments, the data plane module 181 does not receive the next hop reference associated with the peripheral processing device operatively coupled to the port 122 and the data plane module 182 does not receive the next hop reference associated with the peripheral processing device 171 operatively coupled to the port 121.

Similarly, the data plane module 183 receives the next hop references associated with the peripheral processing devices (e.g., peripheral processing device 172) operatively coupled to the ports 123 and 124, the data plane module 184 receives the next hop references associated with the peripheral processing devices (e.g., peripheral processing device 173) operatively coupled to the ports 131 and 132, the data plane module 185 receives the next hop references associated with the peripheral processing devices operatively coupled to the ports 133 and 134, and the data plane module 186 receives the next hop references associated with the peripheral processing devices operatively coupled to the ports 141-144. In such embodiments, each data plane module 181-186 selectively receives its associated next hop references. As discussed above, each data plane module 181-186 can store an association between a next hop reference and its associated next hop identifier in a database local to that data plane module 181-186 (e.g., on a same chip package as that data plane module 181-186).

In some embodiments, each network control entity 191-193 can associate each next hop reference with a final destination identifier (e.g., a MAC address and/or IP address of a final destination device). For example, if the peripheral processing device 172 is a gateway device and/or router operatively coupled to another device (e.g., device 102), the peripheral processing device 172 can be said to be the next hop in a data path between and including the peripheral processing device 174 and that other device 102. Accordingly, the network control entity 192 can associate the next hop reference associated with the peripheral processing device 172 with a final destination identifier of the other device 102. As discussed above, the network control entity 192 can alternatively associate the next hop reference associated with the peripheral processing device 172 with the identifier of the peripheral processing device 172 when the peripheral processing device 172 acts as a final destination device.

In some embodiments, each network control entity 191-193 can send the associations between the final destination identifiers and the next hop references to the network management module 155. In such embodiments, the network management module 155 can assemble, control and/or maintain a database (e.g., database 1000) that includes an association and/or map between each final destination identifier and the access switch identifier, data plane module identifier and next hop reference associated with the next hop (e.g., a peripheral processing device) in a data path. In other embodiments, each network control entity 191-193 sends the associations to the other network control entities 191-193 instead of the network management module 155. In such embodiments, the network control entities 191-193 collectively assemble, control and/or maintain a database similar to the database 1000.

In some embodiments, each network control entity 191-193 can monitor and/or manage the group of ports 161-163 with which it is associated. For example, each network control entity 191-193 can detect a change in state associated with its associated group of ports 161-163. In some embodiments, for example, a network control entity 191-193 can detect when a peripheral processing device 171-174 is operatively coupled and/or decoupled from a port 121-124, 131-134, 141-144 from its associated group of ports 161-163. In some embodiments, the network control entities 191-193 can send updated forwarding-state information (e.g., port identifiers, network segment identifiers, peripheral processing device identifiers, next hop references, next hop identifiers, etc.) to the other network control entities 191-193 and/or network management module 155 based on a change in state at the network control entity 191-193. Additionally, the network control entities 191-193 can assign the peripheral processing device a next hop reference and send the next hop reference along with any final destination identifiers to the network management module 155 and/or to store in a database similar to the database 1000.

A data packet (e.g., an Ethernet packet and/or frame, a Fibre Channel packet and/or frame, etc.) can be sent between peripheral processing devices 171-174 using the switch fabric system 100. For example, a data packet can be sent from a source peripheral processing device 174 to a destination peripheral processing device 172. In some embodiments, the destination peripheral processing device 172 is a next hop in a data path to a final destination (e.g., device 102 connected to the peripheral processing device 172 independent of the access switch 120). In other embodiments, the destination peripheral processing device 172 is the final destination. Such a data packet can be similar to the data packet 400 shown in FIG. 5. The data packet 400 includes a payload 420 and a destination identifier 410. The payload 420 includes the data to be sent to a final destination. The destination identifier 410 includes an identifier and/or address (e.g., a MAC address and/or an IP address) associated with a final destination of the payload 420.

The source peripheral processing device 174 can send the data packet to the data plane module 186 at the access switch 140 through port 142 using a first lower level protocol (e.g., Ethernet, Fibre Channel, etc.). The data plane module 186 can prepare the data packet 400 to enter the data plane portion of the communications network 110. For example, the data plane module 186 can use the destination ID 410 to query the database 1000 to retrieve information to append to the data packet 400 to be used by the data plane portion of the communications network 110 and the data plane module 183 at the access switch 120. For example, the data plane module 186 can modify the data packet 400 to be similar to the data packet 500 shown in FIG. 6. Specifically, the data plane module 186 can query the database 1000 (FIG. 8) stored at the network management module 155 using the destination ID 410. Using the destination ID 410 as a key and/or reference for a value in the final destination ID 1010 column in the database 1000, the network management module 155 can send a value in the access switch ID column 1020, a value in the data plane module ID column 1030, and a value in the next hop reference column 1040 to the data plane module 186. The data plane module 186 can append the access switch ID 510 (corresponding to a value in the access switch ID column 1020), the data plane module ID 520 (corresponding to a value in the data plane module ID column 1030) and the next hop reference 530 (corresponding to a value in the next hop reference column 1040) to the data packet 500. In other embodiments, the database 1000 (FIG. 8) is stored in a memory local to the data plane module 186. In such embodiments, the data plane module 186 retrieves a value in the access switch ID column 1020, a value in the data plane module ID column 1030, and a value in the next hop reference column 1040 from the locally stored database 1000.

In some embodiments, the data plane module 186 at the access switch 140 can also divide and/or partition the data packet 400 (i.e., the destination ID 410 and the payload 420) into multiple data cells (e.g., having fixed length payloads) to be sent through the data plane portion of the communications network 110 to the access switch 120. In such embodiments, each cell can include an access switch ID 510, a data plane module ID 520, and a next hop reference 530. In other embodiments, each cell includes an access switch ID 510 and a data plane module ID 520 but the next hop reference 530 is split up into the cells similar to the destination ID 410 and the payload 420.

The data packet and/or cells is/are sent from the data plane module 186 at the access switch 140 to the data plane module 183 at the access switch 120 through the data plane portion of the communications network 110. The data plane portion of the communications network 110 can route and/or forward the data packet and/or cells based on the access switch ID 510 and/or the data plane module ID 520. In some embodiments, the data plane portion of the communications network 110 can use a second lower level protocol (e.g., a cell based protocol), different than the first lower level protocol (e.g., Ethernet, Fibre Channel, etc.) used to send the data packet from the peripheral processing device 174 to the access switch 140. Accordingly, in such embodiments, while the data packet can transverse multiple physical hops when in the data plane portion of the communications network 110, the path between the access switch 140 and the access switch 120 can be a single logical hop from the perspective of the first lower level protocol.

The data plane module 183 at the access switch 120 can receive the data packet and/or cells and prepare the data packet and/or cells to be sent to the peripheral processing device 172 via the port 123. In some embodiments, such preparation can include reconstructing and/or reassembling the data packet from the data cells. More generally, the access switch 120 can prepare the data packet to be sent to the peripheral processing device 172 using the first lower level protocol (e.g., Ethernet, Fibre Channel, etc.).

Such preparation can also include removing the access switch ID 510 and the data plane module ID 520 from the data packet 500. Additionally, such preparation can include replacing the next hop reference 530 with a next hop ID 620 (shown in FIG. 7). Such a next hop ID 620 can be a global identifier (e.g., a MAC address and/or an IP address) of the peripheral processing device 172. The data plane module 183 can use the next hop reference 530 to query a locally-stored database (e.g., a database stored on a same chip storing and/or executing the data plane module 183) to retrieve the next hop ID 620 associated with that next hop reference 530. This locally-stored database can store an association between the next hop ID 620 and the next hop reference 530 for that data plane module 183. Thus, the number of entries (i.e., rows) in the locally-stored database can be equal to the number of peripheral processing devices associated with that data plane module 183. The data plane module 183 then replaces the next hop reference 530 with the next hop ID 620 such that the data packet is similar to the data packet 600 in FIG. 7. The data packet 600 can then be sent to the peripheral processing device 172 associated with the next hop ID 620. In some embodiments, the peripheral processing device 172 can forward the data packet to the device 102 based on the destination identifier 410.

While shown and described above as storing database 1000, in other embodiments, each network control entity 191-194 and/or data plane module 181-186 maintains and/or stores the database 1000. In some embodiments, for example, each network control entity 191-193 can provide updates to the other network control entities 191-193 when control information and/or forwarding-state information associated with that network control entity 191-193 changes. For example, a network control entity 191-193 can provide associations between final destination identifiers and next hop references with which it is associated to the other network control entities 191-193.

While each peripheral processing device coupled to a port controlled by a network control entity is shown and described above as having a different and/or unique next hop reference with respect to that network control entity, in some embodiments multiple peripheral processing devices can be assigned the same next hop reference with respect to that network control entity. FIG. 9, for example, shows a portion of a switch fabric system 700 illustrating such a situation. The portion of the switch fabric system 700 includes an access switch 720 having a first port 721 and a second port 722, and hosts a network control entity 791. Both the first port 721 and the second port 722 are part of a group of ports 761 controlled by the network control entity 791.

A first peripheral processing device 771 is operatively coupled to the first port 721, and a second peripheral processing device 772 is operatively coupled to the second port 722. Additionally, the first peripheral processing device 771 is operatively coupled to the second peripheral processing device 772 independent of the switch fabric system 700 (i.e., not through the access switch 720) via the data path 775. Accordingly, to send data to the first peripheral processing device 771, the access switch 720 can send data to the peripheral processing device 771 via the port 721 or via the port 722 (through peripheral processing device 772 and data path 775). Thus, both the first peripheral processing device 771 and the second peripheral processing device 772 can be said to be next hops in a data path between the access switch 720 and the second peripheral processing device 772. This can cause indefiniteness when an ingress data plane module (not shown in FIG. 9) is determining which next hop reference to append to a data packet destined for the second peripheral processing device 772. Similarly stated, the final destination identifier (i.e., the identifier of the second peripheral processing device 772) will have multiple entries in database associating final destination identifiers with next hop references (e.g., database 1000 of FIG. 8).

Similarly, the access switch 720 can send data to the second peripheral processing device 772 directly (via port 722) or through the first peripheral processing device 771 (via port 721). Thus, both the first peripheral processing device 771 and the second peripheral processing device 772 can be said to be next hops in a data path between the access switch 720 and the first peripheral processing device 771.

Additionally, such a situation can cause an infinite loop between the access switch 720 and a peripheral processing device 771 or 772. For example, if the data plane module of the access switch 720 (not shown in FIG. 9) is attempting to send a data packet to the peripheral processing device 771 via the peripheral processing device 772, the peripheral processing device 772 can attempt to send the data packet to the peripheral processing device 771 via the access switch 720. Accordingly, the data packet is continuously sent between the peripheral processing device 772 and the access switch 720 without reaching peripheral processing device 771.

To remedy the indefiniteness at the ingress data plane module and the possibility of an infinite loop, and to ensure that a correct next hop reference is appended to a data packet, either the direct link between the access switch 720 and the peripheral processing device 771 or the direct link between the access switch 720 and the peripheral processing device 772 is effectively rendered inactive. This can be done by not assigning a separate next hop reference to one of the peripheral processing devices 771, 772. For example, if the direct link between the access switch 720 and the second peripheral processing device 772 is effectively rendered inactive, both the identifier (e.g., IP address and/or MAC address) of the first peripheral processing device 771 and the identifier of the second peripheral processing device 772 are associated with a same next hop reference. That next hop reference refers to and/or is associated with the identifier of the first peripheral processing device 771. Accordingly, in the database associating final destination identifiers with next hop references (e.g., database 1000), the entries for the final destination identifier of the first peripheral processing device 771 and the final destination identifier of the second peripheral processing device 772 are associated with a next hop reference that uniquely identifies the first peripheral processing device 771 to the network control entity 791. Additionally, any other devices operatively coupled to the peripheral processing device 772 can be associated with a next hop reference that uniquely identifies the first peripheral processing device 771 to the network control entity 791. Thus, any data packet with a final destination of the first peripheral processing device 771, the second peripheral processing device 772 or any other peripheral processing device operatively coupled to the first peripheral processing device 771 or the second peripheral processing device 772 independent of the switch fabric system 700 (i.e., not through the access switch 720) can be sent through the port 721 and to the peripheral processing device 771. The peripheral processing device 771 can then route and/or switch the data packet accordingly.

Figure 10:
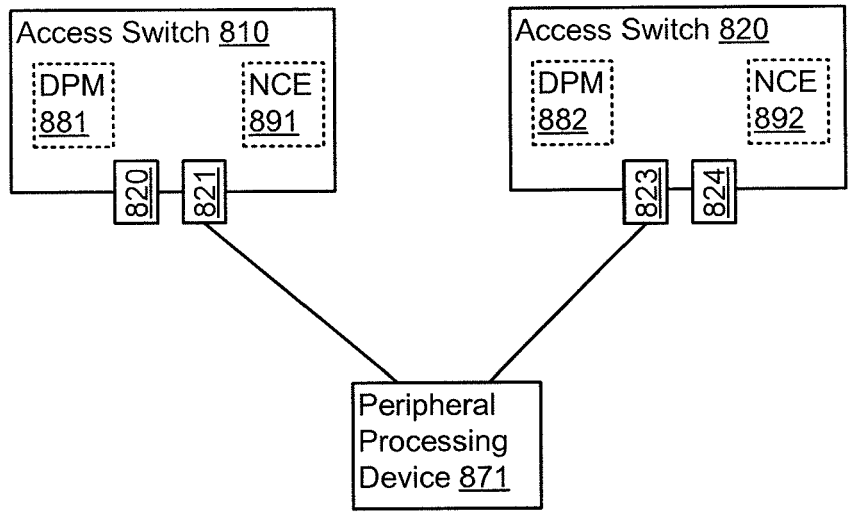

As discussed above, in some situations and/or configurations the network reference associated with a peripheral processing device can be globally unique with respect to a switch fabric system rather than locally unique with respect to a network control entity. FIG. 10, for example, shows a portion of a switch fabric system illustrating such a situation. FIG. 10 illustrates a portion of a switch fabric system 800 in which multiple ports 821 and 823 managed by different network control entities 891 and 892, respectively, are coupled to the same peripheral processing device 871.

The portion of the switch fabric system 800 includes a first access switch 810, a second access switch 820 and a peripheral processing device 871. The first access switch 810 includes multiple ports 820, 821, a data plane module 881 and a network control entity 891. The data plane module 881 interfaces with the ports 820 and 821, and the network control entity 891 controls and/or manages the data plane module 881 and the ports 820, 821. Similarly, the second access switch 820 includes multiple ports 823, 824, a data plane module 882 and a network control entity 892. The data plane module 882 interfaces with the ports 823 and 824, and the network control entity 892 controls and/or manages the data plane module 882 and the ports 823, 824.

As shown in FIG. 10, both the port 821 and the port 823 are operatively coupled to the peripheral processing device 871. Accordingly, to ensure that the peripheral processing device 871 is associated with a single next hop reference, the next hop reference associated with the peripheral processing device 871 can be the same for both the network control entity 891 and the network control entity 892. In some embodiments, because the next hop reference is consistent with respect to multiple network control entities 891, 892, the next hop reference can be globally unique (i.e., identify the peripheral processing device 871 to each network control entity within the switch fabric system 800). In other embodiments, the next hop reference can identify the peripheral processing device 871 to the network control entities 891, 892 (e.g., regionally unique), but not to other network control entities (not shown in FIG. 10) within the switch fabric system 800.

Accordingly, when an ingress data plane module receives a data packet having a final destination identifier associated with the peripheral processing device 871 (i.e., the final destination identifier is the identifier of the peripheral processing device 871 or another peripheral processing device to which the peripheral processing device 871 is coupled independent of the switch fabric system 800), the ingress data plane module can query a database (similar to database 1000 of FIG. 8) for the globally unique next hop reference using the final destination identifier as an index and/or a key. Such a globally unique next hop reference can be associated with two access switch identifiers (e.g., the identifier of the first access switch 810 and the identifier of the second access switch 820), as well as two data plane module identifiers (e.g., the identifier of the first data plane module 881 and the identifier of the second data plane module 882). The ingress data plane module can determine to which access switch 810, 820 and data plane module 881, 882 to address the data packet using any suitable method. In some embodiments, the ingress module can address the data packet randomly, based on a load-balancing algorithm, based on the congestion at the access switches 810, 820 and/or data plane modules 881, 882, and/or the like. After the ingress data plane module has addressed the data packet, the data packet can be sent to the data plane module 181, 182 at the access switch 810, 820 to which it was addressed. Using the globally-unique next hop reference, the data plane module 181, 182 can retrieve the next hop identifier associated with the peripheral processing device 871 and send the data packet accordingly.

Figure 11:
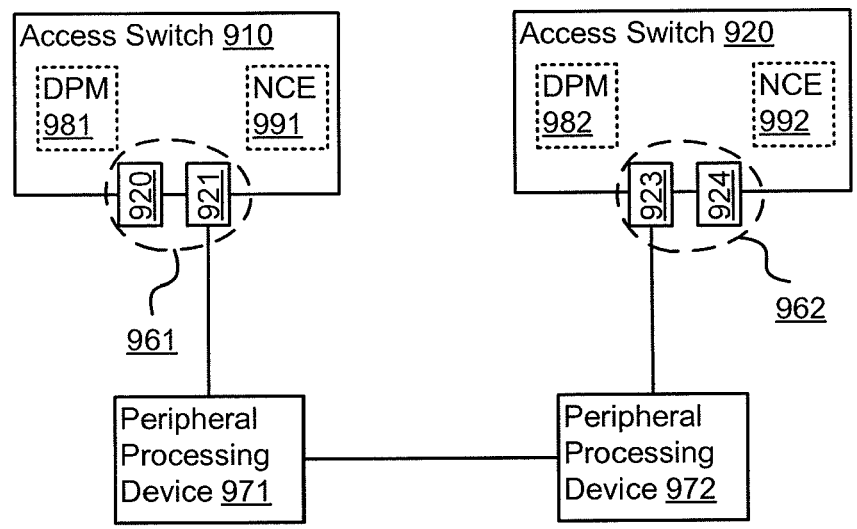

FIG. 11, for another example, illustrates a portion of a switch fabric system 900 in which multiple ports 921, 923 managed by different network control entities 991 and 992, respectively, are coupled to peripheral processing devices 971, 972, which in turn are coupled to each other independent of the switch fabric system 900 (i.e., not through the access switches 910 and 920). The portion of the switch fabric system 900 includes a first access switch 910, a second access switch 920, a first peripheral processing device 971 and a second peripheral processing device 972. The first access switch 910 includes multiple ports 920, 921, a data plane module 981 and a network control entity 991. The data plane module 981 interfaces with the ports 920 and 921, and the network control entity 991 controls and/or manages the data plane module 981 and the ports 920, 921. Similarly, the second access switch 920 includes multiple ports 923, 924, a data plane module 982 and a network control entity 992. The data plane module 982 interfaces with the ports 923 and 924, and the network control entity 992 controls and/or manages the data plane module 982 and the ports 923, 924.

As shown in FIG. 11, the port 921 is operatively coupled to the peripheral processing device 971 and the port 923 is operatively coupled to the peripheral processing device 972. The peripheral processing device 971 is operatively coupled to the peripheral processing device 972 independent from the access switch 910 and the access switch 920. Such a configuration presents an issue similar to the issue discussed with respect to FIG. 9. Accordingly, to ensure that a correct next hop reference is appended to a data packet to be sent to either the peripheral processing device 971 or the peripheral processing device 972, either the direct link between the access switch 910 and the peripheral processing device 971 or the direct link between the access switch 920 and the peripheral processing device 972 is effectively rendered inactive.

Additionally, even though the peripheral processing devices 971 and 972 are operatively coupled to the portion of the switch fabric system 900 via multiple ports 921, 923 controlled by different network control elements 991, 992, because one of the direct links is effectively rendered inactive, a next hop reference unique to either the network control entity 991 or the network control entity 992 can be used. Similarly stated, a non-globally-unique next hop reference can be used. For example, if the direct connection between the port 923 and the peripheral processing device 972 is effectively rendered inactive, any data packet to be sent to either the peripheral processing device 971 or the peripheral processing device 972 can be sent to the access switch 910 and the data plane module 981. Accordingly, as long as the next hop reference is unique to the network control entity 991 controlling the data plane module 981, the data packet can be correctly forwarded to the peripheral processing device 971 and then to the peripheral processing device 972, as appropriate.

In other embodiments, a common globally unique next hop reference can be used and/or assigned to both the peripheral processing device 971 and the peripheral processing device 972. As such, both the network control entity 991 controlling the active link and the network control entity 992 controlling the inactive link store and/or include the globally unique next hop reference. In such embodiments, if the active link (i.e., the link between the port 921 and the peripheral processing device 971) fails, the inactive link (i.e., the link between the port 923 and the peripheral processing device 972) can be activated and used as a backup link without sending a new next hop identifier to the other network control entities and/or the other peripheral processing devices within the switch fabric system. Similarly stated, in such embodiments, because a globally unique next hop reference is used, the peripheral processing devices and/or access switches sending data to the peripheral processing device 971 or peripheral processing device 972 use the same next hop identifier regardless of which link is active.

In still other embodiments, a common regionally unique identifier is used as a next hop reference. In such embodiments, the common regionally unique identifier can be unique to the pair of network control entities 991 and 992, but not unique to the rest of the system.

Figure 12:
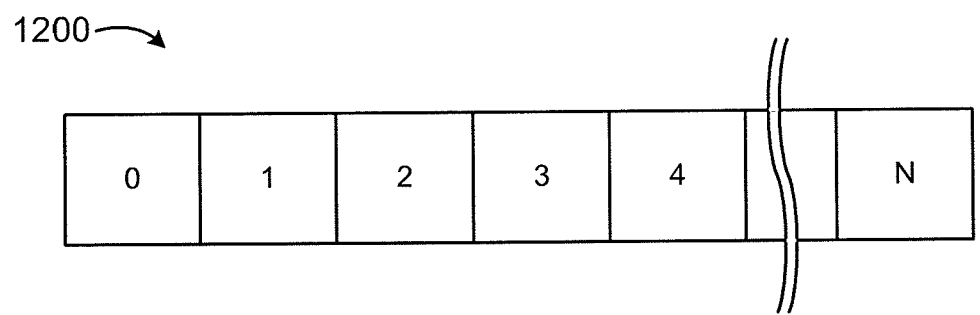
FIG. 12 is a schematic illustration of a memory address block used to index next hop references, according to another embodiment.

In some embodiments, each next hop reference can be an address, index and/or a pointer to a portion and/or block of a memory containing the associated next hop identifier. For example, FIG. 12 illustrates an address space 1200 having addresses used as next hop references. The address space 1200 includes multiple memory address blocks 0-N. In some embodiments, the address space includes sixteen memory address blocks. In other embodiments, the address space includes more or less than sixteen memory address blocks.

In some embodiments, the memory address block 0 of the address space 1200 can be allocated for use by each network control entity within a switch fabric system to define next hop references. For example, each network control entity can use the memory addresses associated with the memory block 0 to define next hop references specific to each network control entity. For example, if the memory address block 0 includes memory addresses 0-999, each network control entity can assign a peripheral processing device with which it is associated the next hop reference 0. For each network control entity and/or data plane module, such a memory address (e.g., next hop reference 0) can point to different block of memory (e.g., on a compute device or access switch hosting a particular network control entity or data plane module) containing a next hop identifier. Similarly stated, the next hop reference 0 can point to a different next hop identifier for each network control entity.

The remaining memory address blocks 1-N of the address space 1200 can be used as globally-unique next hop references. Such globally-unique next hop references can be similar to those described with respect to FIG. 10. Additionally, while each network control entity can use and/or assign the addresses associated with the memory address block 0, because the remaining memory address blocks 1-N are used for globally-unique next hop references, a network management module (e.g., network management module 155 of FIG. 1) can be used to assign and/or control such memory address blocks 1-N. Each network control entity can then retrieve the next hop references within the memory address blocks 1-N with which it is associated. For example, in FIG. 10, the network control entity 891 and the network control entity 892 can request and/or retrieve the next hop reference associated with the peripheral processing device 871 from a network management module. In some embodiments, the other network control entities (i.e., those without a port coupled to the peripheral processing device 871) do not request and/or retrieve the next hop reference associated with the peripheral processing device 871. Thus, although the next hop reference can be globally unique, not all network control entities store the globally unique address.

In some embodiments, multiple network management modules can be used to manage and/or control the network control entities and/or the address space 1200. In such embodiments, the address space 1200 can be shared between network management modules. Accordingly, the memory address blocks 1-N allocated for globally-unique next hop references are shared between the network management modules. Similarly stated, the next hop references of the memory address blocks 1-N point to a same next hop identifier on each network management module. Accordingly, although such a system includes multiple network management modules, the next hop references associated with the memory address blocks 1-N are consistent across the network management modules.

In some embodiments having multiple network management modules, each of the memory address blocks 1-N can be assigned a master network management module. In such embodiments, a master network management module allocates the next hop references associated with the memory address block with which it is assigned. For example, if memory address block 1 is associated with a first network management module, the first network management module will allocate and/or assign next hop references associated with that memory address block. While a second network management module can store a copy of the assigned next hop references, it does not make the assignments. Accordingly, in such a manner, multiple network management modules can share a memory space 1200.

Figure 13:
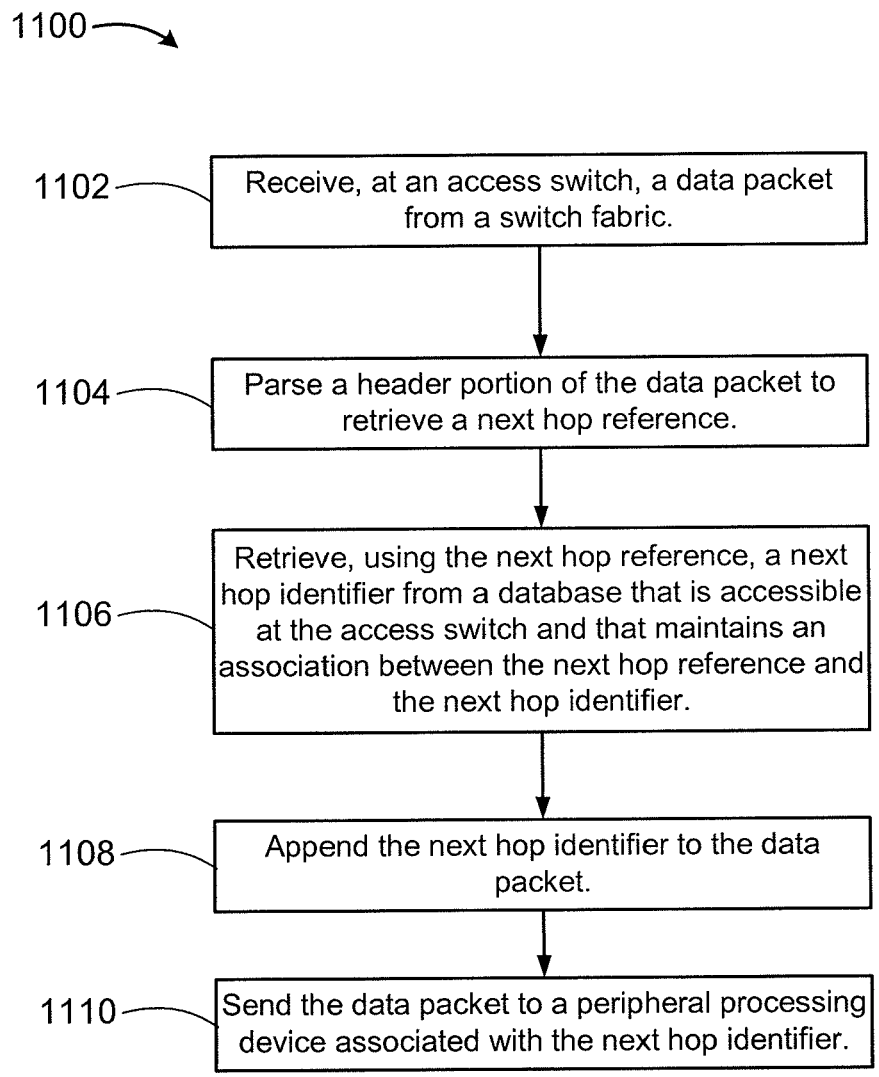
FIG. 13 is a flow chart illustrating a method of forwarding a data packet using a next hop reference, according to another embodiment.

FIG. 13 is a flow chart illustrating a method 1100 of forwarding a data packet. The method 1100 includes receiving, at an access switch, a data packet from a switch fabric, at 1102. In some embodiments, the access switch is a first access switch and the data packet is sent to the switch fabric from a second access switch. In some embodiments, the first access switch and the second access switch can be similar to the other access switches shown and described herein (e.g., access switches 120, 130, 140 shown and described with respect to FIG. 1). In some embodiments, the first access switch can include a data plane module that receives the data packet from the switch fabric.

A header portion of the data packet is parsed to retrieve a next hop reference, at 1104. The next hop reference was appended to the data packet at the second access switch prior to being received at the first access switch. The next hop reference can be unique to a network control entity that controls and/or manages the data plane module. More specifically, the next hop reference can uniquely identify to that network control entity a peripheral processing device coupled to a port of the first access switch that that network control entity controls and/or manages. In some embodiments, the next hop reference is not, however, globally unique (i.e., does not identify the same peripheral processing device at each network control entity). Accordingly, the next hop reference occupies less memory and/or a smaller portion of a data packet than a globally-unique identifier.

A next hop identifier is retrieved, using the next hop reference, from a database that is accessible at the access switch (e.g., the first access switch) and that maintains an association between the next hop reference and the next hop identifier, at 1106. The next hop identifier is associated with a peripheral processing device. In some embodiments, the next hop identifier is an IP address, a MAC address and/or some other address that identifies the peripheral processing device. In some embodiments, the next hop identifier is globally unique (i.e., uniquely identifies the peripheral processing device to each network control entity and/or access switch within the system). In some embodiments, such a database is locally stored at a memory of the data plane module of the first access switch. In such embodiments and as described above, the database can remain relatively small and any database queries and/or lookups can be relatively fast.

The next hop identifier is appended to the data packet, at 1108 and the data packet is sent to the peripheral processing device, at 1110. If the peripheral processing device is not the final destination of the data packet, the peripheral processing device can use the destination identifier within a header portion of the data packet to further forward the data packet to the next hop.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

Embodiments shown and described above refer to multiple peripheral processing devices, including compute notes, storage nodes, service nodes and routers. In some embodiments, one or more of the compute nodes can be general-purpose computational engines that can include, for example, processors, memory, and/or one or more network interface devices (e.g., a network interface card (NIC)). In some embodiments, the processors within a compute node can be part of one or more cache coherent domains. In some embodiments, the compute nodes can be host devices, servers, and/or so forth. In some embodiments, one or more of the compute nodes can have virtualized resources such that any compute node (or a portion thereof) can be substituted for any other compute node (or a portion thereof) operatively coupled to a switch fabric system.

In some embodiments, one or more of the storage nodes can be devices that include, for example, processors, memory, locally-attached disk storage, and/or one or more network interface devices. In some embodiments, the storage nodes can have specialized modules (e.g., hardware modules and/or software modules) configured to enable, for example, one or more of the compute nodes to read data from and/or write data to one or more of the storage nodes via a switch fabric. In some embodiments, one or more of the storage nodes can have virtualized resources so that any storage node (or a portion thereof) can be substituted for any other storage node (or a portion thereof) operatively coupled to a switch fabric system.

In some embodiments, one or more of the services nodes can be an open systems interconnection (OSI) layer-4 through layer-7 device that can include, for example, processors (e.g., network processors), memory, and/or one or more network interface devices (e.g., 10 Gb Ethernet devices). In some embodiments, the services nodes can include hardware and/or software configured to perform computations on relatively heavy network workloads. In some embodiments, the services nodes can be configured to perform computations on a per packet basis in a relatively efficient fashion (e.g., more efficiently than can be performed at, for example, a compute node). The computations can include, for example, stateful firewall computations, intrusion detection and prevention (IDP) computations, extensible markup language (XML) acceleration computations, transmission control protocol (TCP) termination computations, and/or application-level load-balancing computations. In some embodiments, one or more of the services nodes can have virtualized resources so that any service node (or a portion thereof) can be substituted for any other service node (or a portion thereof) operatively coupled to a switch fabric system.

In some embodiments, one or more of the routers can be networking devices configured to connect at least a portion of a switch fabric system (e.g., a data center) to another network (e.g., the global Internet). In some embodiments, for example, a router can enable communication between components (e.g., peripheral processing devices, portions of the switch fabric) associated with a switch fabric system. The communication can be defined based on, for example, a layer-3 routing protocol. In some embodiments, one or more of the routers can have one or more network interface devices (e.g., 10 Gb Ethernet devices) through which the routers can send signals to and/or receive signals from, for example, a switch fabric and/or other peripheral processing devices.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. An apparatus implemented in at least one of a memory or a processing device, comprising:
    a first network control entity to manage a first data plane module associated with a port from a plurality of ports at a first access switch, the first network control entity to associate an identifier of a first peripheral processing device operatively coupled to the port from the plurality of ports with a next hop reference, the next hop reference being associated with an identifier of a second peripheral processing device at a third network control entity, the first network control entity to provide the next hop reference to a second network control entity that manages a second data plane module at a second access switch such that the second data plane module can append the next hop reference to a data packet when the first peripheral processing device is within a data path between and including the second access switch and a destination peripheral processing device.

2. The apparatus of claim 1, wherein the first peripheral processing device is the destination peripheral processing device.

3. The apparatus of claim 1, wherein the first peripheral processing device is distinct from the destination peripheral processing device.

4. The apparatus of claim 1, wherein the first data plane module is to remove the next hop reference from the data packet and append the identifier of the first peripheral processing device to the data packet prior to sending the data packet to the first peripheral processing device.

5. The apparatus of claim 1, wherein the second data plane module is to prepare a data packet to be sent via a switch fabric to the first data plane module.

6. The apparatus of claim 1, wherein the second data plane module is operatively coupled to the first data plane module via a single logical hop having multiple physical hops.

7. A non-transitory processor-readable medium storing code representing instructions to cause a processor to:
    receive, at a first access switch, a data packet from a switch fabric, the data packet being sent to the switch fabric from a second access switch;
    parse a header portion of the data packet to retrieve a next hop reference, the next hop reference having been appended to the data packet at the second access switch prior to being received at the first access switch;
    retrieve, using the next hop reference, a next hop identifier of a first peripheral processing device from a database that is accessible at the first access switch and that maintains an association between the next hop reference and the next hop identifier of the first peripheral processing device, the association between the next hop reference and the next hop identifier of the first peripheral processing device being a result of a first network control entity that manages a port to which the first peripheral processing device is coupled assigning the next hop reference to the next hop identifier of the first peripheral processing device, a second network control entity that manages a port to which a second peripheral processing device is coupled to assign the next hop reference to a next hop identifier of the second peripheral processing device;
    append the next hop identifier of the first peripheral processing to the data packet; and
    send the data packet to the first peripheral processing device.

8. The non-transitory processor-readable medium of claim 7, wherein the first network control entity and the second network control entity is from a plurality of network control entities, the next hop reference is unique within the first network control entity from the plurality of network control entities, the next hop identifier of the first peripheral processing device being unique across the plurality of network control entities.

9. The non-transitory processor-readable medium of claim 7, wherein the next hop reference is a first size, the next hop identifier of the first peripheral processing device is a second size greater than the first size.

10. The non-transitory processor-readable medium of claim 7, further comprising code representing instructions to cause the processor to:
    associate the next hop identifier of the first peripheral processing device with the next hop reference to produce an association of the next hop identifier of the first peripheral processing device with the next hop reference; and
    send the association of the next hop identifier of the first peripheral processing device with the next hop reference to the second access switch.

11. A system, comprising:
    a first network control entity, at a first processor, to manage a first port to be operatively coupled to a first peripheral processing device and a second port to be operatively coupled to a second peripheral processing device, the first network control entity to assign a first next hop reference to the first peripheral processing device and a second next hop reference to the second peripheral processing device; and
    a second network control entity, at a second processor, to manage a third port to be operatively coupled to the first peripheral processing device and a fourth port to be operatively coupled to a third peripheral processing device, the second network control entity to assign the first next hop reference to the first peripheral processing device and the second next hop reference to the third peripheral processing device, the first network control entity and the second network control entity to provide the first next hop reference and the second next hop reference to a third network control entity such that a data plane module associated with the third network control entity can append the second next hop reference to the data packet when sending the data packet to the second peripheral processing device or the third peripheral processing device.

12. The system of claim 11, wherein the data plane module associated with the third network control entity appends the first next hop reference to a data packet when sending the data packet to the first peripheral processing device.

13. The system of claim 11, wherein the first network control entity is a master network control entity with respect to the first peripheral processing device, the first network control entity to send and receive forwarding-state information associated with the first peripheral processing device.

14. The system of claim 11, further comprising:
a network management module storing the first next hop reference in a first portion of a memory and the second next hop reference in a second portion of the memory, the first portion of the memory storing a plurality of next hop references shared between the first network control entity and the second network control entity, the plurality of next hop references including the first next hop reference, the second portion of the memory being specific to each of the first network control entity and the second network control entity.

15. The system of claim 11, wherein the first port and the second port are at a first access switch, the third port and the fourth port are at a second access switch, the first access switch being operatively coupled to the second access switch via a switch fabric.

16. The system of claim 11, wherein the first port, the second port, the third port and the fourth port are at a first access switch, the first access switch to send data to and receive data from a second access switch via a switch fabric.

17. The system of claim 11, wherein a data plane module at an access switch determines to send a data packet to the first peripheral processing device via a switch fabric and the first port based on an availability of the first port and an availability of the third port.

18. The system of claim 11, wherein a data plane module associated with the second port is to remove the second next hop reference from a data packet received from a switch fabric and append a peripheral processing device identifier associated with the second peripheral processing device to the data packet prior to sending the data packet to the second peripheral processing device.

* * * * *